(12) United States Patent
Hines et al.

(10) Patent No.: US 11,311,779 B2
(45) Date of Patent: Apr. 26, 2022

(54) ADJUSTABLE CLIMBING STAND

(71) Applicant: Take It, LLC, Leslie, MI (US)

(72) Inventors: Matthew Russell Hines, Byron, MI (US); Gabriel Andrew Kuschel, Leslie, MI (US)

(73) Assignee: Take It, LLC, Leslie, MI (US)

( * ) Notice: Subject to any disclaimer, the term of this patent is extended or adjusted under 35 U.S.C. 154(b) by 281 days.

(21) Appl. No.: 16/401,562

(22) Filed: May 2, 2019

(65) Prior Publication Data
US 2019/0336828 A1    Nov. 7, 2019

Related U.S. Application Data

(60) Provisional application No. 62/665,861, filed on May 2, 2018.

(51) Int. Cl.
*A01M 31/02* (2006.01)
*A63B 27/00* (2006.01)

(52) U.S. Cl.
CPC ............ *A63B 27/00* (2013.01); *A01M 31/02* (2013.01)

(58) Field of Classification Search
CPC ............................... A63B 27/00; A01M 31/02
See application file for complete search history.

(56) References Cited

U.S. PATENT DOCUMENTS

| | | | |
|---|---|---|---|
| 3,065,821 A | 11/1962 | Hundley, Jr. | |
| 3,150,740 A * | 9/1964 | Rubeli | E04H 12/185 |
| | | | 182/41 |
| 4,205,733 A | 6/1980 | Wade | |
| 4,411,335 A | 10/1983 | Forrester | |
| 4,969,538 A | 11/1990 | Amacker | |
| 5,462,134 A * | 10/1995 | Van Helmond | E04G 7/301 |
| | | | 182/178.3 |
| 5,640,802 A * | 6/1997 | Elliott | A01G 9/12 |
| | | | 248/156 |
| 5,647,454 A * | 7/1997 | Fehr | A63B 27/00 |
| | | | 182/133 |
| 5,827,440 A * | 10/1998 | Furuya | B29C 45/14073 |
| | | | 249/91 |
| 5,927,440 A * | 7/1999 | Freeman | B66B 9/16 |
| | | | 187/270 |

(Continued)

FOREIGN PATENT DOCUMENTS

WO    WO-2012131439 A1 * 10/2012 ............. A63B 27/00

*Primary Examiner* — Alvin C Chin-Shue
(74) *Attorney, Agent, or Firm* — Loomis, Ewert, Parsley, Davis & Gotting P.C.; Mikhail Murshak

(57) ABSTRACT

A climbing apparatus includes a mast having a plurality of mast segments operable to vertically stack one after another. Each segment includes a stand-off to abut against a climbing object and form a space for receiving a strap to secure the mast to the climbing object. The apparatus includes a platform assembly having a (i) a platform, (ii) a seat spaced apart from the platform, and (iii) a frame connecting the seat to the platform. An upper trolley is provided for independent mobility up and down along the mast. The upper trolley includes a first brake connected to a handle operable to actuate movement of the trolley. A lower trolley is provided and is operable for independent mobility up and down along the mast relative to the upper trolley. The lower trolley includes a second brake and is connected to the frame of the platform assembly.

19 Claims, 28 Drawing Sheets

(56) References Cited

U.S. PATENT DOCUMENTS

| | | | | |
|---|---|---|---|---|
| 6,079,517 A | * | 6/2000 | Payne | A01M 31/02 |
| | | | | 182/133 |
| 7,281,607 B1 | * | 10/2007 | Kiraly | A01M 31/02 |
| | | | | 182/102 |
| 7,823,694 B2 | * | 11/2010 | Motes | A01M 31/02 |
| | | | | 182/133 |
| 7,909,139 B2 | | 3/2011 | Blue et al. | |
| 8,210,311 B1 | * | 7/2012 | Rice | A62B 1/20 |
| | | | | 182/9 |
| 8,522,920 B1 | * | 9/2013 | Salyer | A01M 31/02 |
| | | | | 182/188 |
| 9,863,734 B2 | * | 1/2018 | Matthews | A01M 31/02 |
| 10,582,704 B2 | * | 3/2020 | Wheelington | A01M 31/02 |
| 2007/0095611 A1 | * | 5/2007 | Oertwig | A01M 31/02 |
| | | | | 182/142 |
| 2007/0175702 A1 | | 8/2007 | Simone | |
| 2007/0256892 A1 | | 11/2007 | Breedlove, Sr. | |
| 2008/0283334 A1 | | 11/2008 | Fickey | |
| 2009/0321186 A1 | * | 12/2009 | Louchart | A01M 31/02 |
| | | | | 182/188 |
| 2015/0361722 A1 | | 12/2015 | Chick | |

* cited by examiner

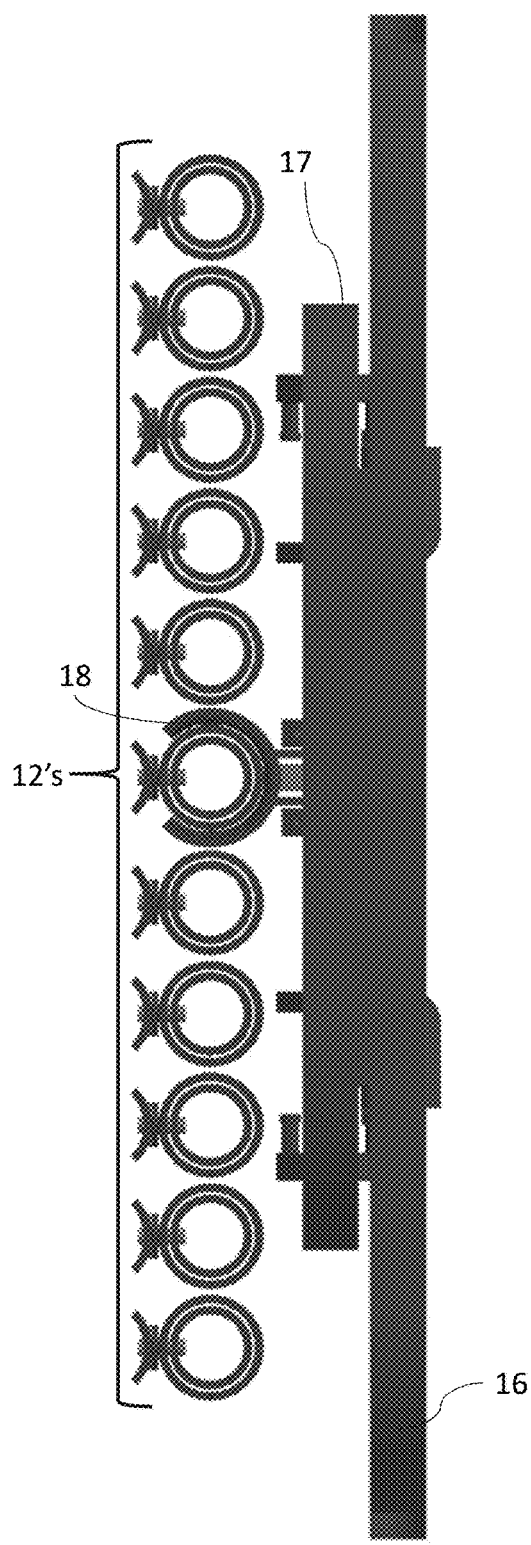
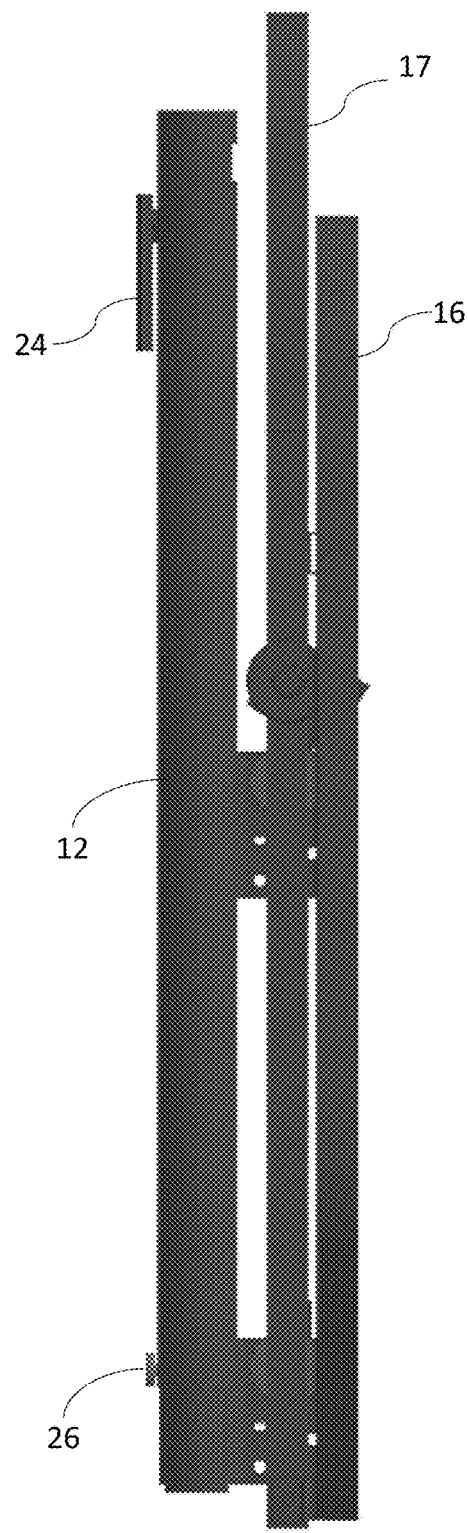
FIG. 6B
FIG. 6C

ADJUSTABLE CLIMBING STAND

CROSS REFERENCE TO RELATED APPLICATION

This Application claims priority to and the benefit of U.S. Provisional Patent Application No. 62/665,861, titled "ADJUSTABLE CLIMBING STAND," and filed on May 2, 2018, the disclosure of which is incorporated herein by reference in its entirety for all purposes.

TECHNICAL FIELD

The present disclosure relates generally to the field of hunting, wildlife viewing, and climbing and in particular to an apparatus, system, and method for safely climbing to a higher location.

CROSS REFERENCE TO RELATED APPLICATION

None

DESCRIPTION OF RELATED ART

A climbing apparatus is often used in hunting to aid in achieve a higher vertical position for better visibility, improved concealability, and improved target angles. The climbing apparatus is typically used to aid a person in scaling a vertical member such as a tree or pole. Three typical versions of a climbing apparatus include a hang-on tree stand (also referred to as hang-on platform style), a climbing tree stand, and a tripod. Existing hang-on tree stands, although suitable for most trees and can be small and compact, have risky two-handed set up and generally do not offer a harnessed climbing/setup which makes them unsafe. A standard climbing tree stand allows for ground level set up and increased height capacity, however, they typically require a certain type of tree with limited or no branches, do not function well when trees taper, and tend to be bulky. A tripod style tree stand requires timely set up, are at a fixed height and usually not very portable.

Current devices offering portability are often bulky and lack an integrated solution. Hang-on platform styles require separate large climbing sticks that were not necessarily made to work together. During climbing and assembling of the climbing sticks the climber's ability to secure themselves in case of a fall is limited and complicated if possible at all. Further the platform must be affixed at an elevated level with limited use of the hands. This usually requires the climber to leave the platform on the ground while ascending with a tow line. Once at the desired position the climber retrieves the platform via the tow line while holding on with one hand. Altogether this is a complicated, physical, and time consuming task which is further complicated during low light installation periods.

Climbing stands are bulky and require an ideal vertical member therefore limiting the number of available trees. This member cannot have any horizontal members, such as branches, between the ground and the desired position. A cross section of the tree is preferred to be consistent or have very little taper from bottom to top. This is because it is difficult to adjust the gripping system safely once elevated. It is also advantageous to have a relatively smooth and robust surface on the vertical member. Finding the right tree is therefore difficult. These types of stands cannot be left unattended where security is a concern and it is not possible to leave them elevated to reduce the chance of theft.

U.S. Patent Application No. 2015/0361722 to Dennis Chick is directed to a portable free standing elevated observation platform that incorporates a dual A-frame extension ladder with an upper elevated platform, the elevated platform serving as a framework for a wheeled axle and having a pivotal floor for below platform access, the dual A-frame extension ladder providing an extending rear frame support, a front frame support and a plurality of guy wires and anchors providing the platform with an elevated view of an area without the attachment or support of a tree.

U.S. Pat. No. 7,909,139 to Blue, et al., is directed to a powered lift platform that includes a platform, and at least one guide rail section in operative contact with the platform. Each of the at least one guide rail sections include at least one guide rail and in which a first end of each of the guide rail sections is configured to removably attach to a second end of a second guide rail section. The lift platform also includes a lift mechanism supported by the platform, a lift guide in operative contact with the lift mechanism and attached to the upper portion of the upper guide rail, and a power supply to operate the lift mechanism. In one form, at least one wheel is operatively attached to the powered lift platform. Blue further discloses a method for securing the powered lift platform to a columnar-like support.

U.S. Patent Application No. 2007/0256892 to Michael G. Breedlove, Sr. discloses a ladder stand structures having a ladder assembly and a platform assembly which may be secured in a plurality of positions as the platform assembly is raised or lowered in sliding engagement with the ladder assembly, and an enhanced method of assembling such ladder stand structures.

U.S. Patent Application No. 2007/0095611 to Oertwig discloses a portable, elevating stand is constructed of a platform movably connected to a generally columnar upright support having a height along which movement of the platform is constrained. Connection between the platform and upright support may be through a linkage assembly comprising channels in which are positioned flange portions of the upright support, such flange portions being located along a majority of the height of the upright support. The platform assembly may be driven by a portable electric motor, including the use therefor of a hand-held electric drill, which is carried onto the platform assembly prior to use of the elevating stand. Oertwig further discloses a method of raising and lowering a portable, elevating stand that includes carrying onto the platform assembly a portable motor, engaging the motor with a means for raising or lowering the platform assembly, and operating the motor to effect raising or lowering of the platform assembly.

Despite these attempts to solve the problems associated with a climbing apparatus, none of these teach or suggest an apparatus, system, and/or method having the benefits and features of the present disclosure.

SUMMARY

The present disclosure provides for a climbing apparatus for use in hunting and the like. The climbing apparatus includes: (a) a mast constructed of a plurality of detachable elongated mast segments operable to vertically stack one after another, wherein each mast segment includes a standoff to abut against a climbing object and form a space for receiving a strap to secure the mast to the climbing object; (b) a platform assembly including (i) a platform operable for standing, (ii) a seat spaced apart from the platform, and (iii)

a frame connecting the seat to the platform; (c) an upper trolley operable for independent mobility up and down along the mast, the upper trolley having a first brake mechanism connected to a handle operable to actuate movement of the trolley; and (d) a lower trolley operable for independent mobility up and down along the mast relative to the upper trolley, the lower trolley having a second brake mechanism and connected to the frame of the platform assembly, the lower trolley operable for independent mobility up and down along the mast.

In an example, each of the first and second brake mechanisms engage the mast through a brake pad actuated by the handle and wherein the handle and wherein the handle includes a brake actuating handle. In another form, either the upper or lower trolley includes an over travel catch actuated by a spring for engaging an over travel hole formed on the mast segment. The mast segment can define a configuration selected from the group consisting of cylindrical, ladder shape, rectangular longitudinal C-shape, and combinations thereof. In a further example, each of the first and second brake mechanism is selected from the group consisting of hydraulic brake, radial brake, translation brake, latch type brake, leverage brake, and combinations thereof. In one form, the latch type and leverage type brake further include a release mechanism for release of a binding function In yet another form, the release mechanism can be activated from an advanced trolley by a lever, connected by a cable, to the release mechanism. The frame of the platform assembly can define a shape selected from an H-frame or a single post. The seat of the platform assembly is removable and rotatable relative to the mast.

In another example, the apparatus includes support cables extending from the frame to the platform. The support cables can be connected to a platform level handle to be gathered up by the platform level handle and control a level of the platform. The platform assembly can be foldable for convenient stowing and carrying, and the mast segments can be detachable into a stackable and storable arrangement with the foldable platform assembly. Each mast segment includes a lower end and an opposite top end. Each lower end is tapered to allow for nesting the lower end into an opening formed on the top end of an adjacent mast segment. At least one mast segment further includes a slide fob connected to a nested lower end adapted for added motion to allow for additional adjustability/flexibility. In yet another example, either the upper or lower trolley further includes a manual parking brake handle and an emergency brake handle, each operable to engage and actuate the first and second brake mechanism, respectively.

In still yet a further example, the apparatus further includes a detachable seat (like a saddle or bike seat) that connects to the mast through an additional third trolley having a third brake mechanism and movable up and down the mast independent from any other trolley. Each of the upper and lower trolleys can further include features to accommodate a harness connection point operable to secure a harness of a user for safety. In yet another form, a universal mounting bracket and adjustable tilt plate are provided, wherein a mounting bracket trolley connects the universal mounting bracket to the mast and allows for retrofitting a different platform assembly to the mast.

The present disclosure provides for a tripod accessory having a mast cap connected to tripod extension cables that extend to tripod base members and are operable for securing the mast in an upright freestanding configuration for climbing in the absence of a climbing object. (i.e., tree). In an example, the present disclosure provides for a method of climbing to a desired height using the tripod climbing accessory. The method includes the steps of: (a) setting up a base formed by the base members on ground with a setup tube at a lowest position; (b) connecting at least two mast segments forming the mast; (c) placing the mast into the base with assistance of the setup tube; (d) connecting the upper and lower trolley to at least one of the mast segment; (e) adding additional mast segments with optional trolleys to the mast; (f) placing a mast cap onto on an upper most mast segment; (g) adding the upper most mast segment with cap to the mast; (h) raising the setup tube to an install position; (i) lifting the installed mast segments with a setup assist handle; (j) adding mast segments vertically one by one; (k) moving the upper trolley to a desired location followed by engaging the brake of the upper trolley to hold in place; (l) raising the lower trolley and thus the platform assembly to a desired position up the mast followed by engaging the brake of the lower trolley to hold in place; (m) repeating steps (k) and (l) until a desired height is reached; (g) optionally securing a harness to the upper trolley through a harness connection point for added safety at step (k); and (h) optionally using a motorized unit connected to the upper trolley to move up/down the lower trolley and thus the platform of step (l).

The present disclosure provides for a climbing apparatus wherein at least one of the upper or lower trolley is motorized. The apparatus can further include a control panel for the motorized trolley, wherein the control panel is made operable for actuation of up, down, unlatch and wireless communication to a remote controlling device. The control panel may further accommodate a power outlet for powering or charging an external device. In a further example, a removable power source (battery pack) is employed to provide energy for the motor.

In yet another example, the climbing apparatus further includes a telescoping and folding ladder attachment. The ladder attachment can be a rope. In still yet an even further example, the apparatus includes a plurality of additional trolleys which are utilized for customization and use of additional components, wherein the plurality of additional trolleys allow for more trolleys operable to fit on the mast and; wherein a the plurality of additional trolleys can operate independently, or connected to work together with respect to the other trolleys, or any a combination thereof. The upper and lower trolleys can be ganged together by a cable of sufficient strength to support a user and accessories and optionally include a motorized unit, wherein the cable is then gathered up or released by the motorized unit.

Each standoff of the mast can be removable or collapsible to be more compact. The mast can be cylindrical allowing for the upper and lower trolleys to rotate about a vertical axis defined by the mast. The platform assembly can include sliding brackets at a joint of the frame and the platform to render inoperable the folding function during operation. The sliding brackets can be are supported by a detent for retention in either the engaged or unengaged position. In one example, the apparatus further includes a detachable shooting rail with hoop seat.

The present disclosure further provides for a method of climbing an object (i.e., tree) using a climbing apparatus of any of previously described apparatus. The method includes the steps of: (a) connecting at least two mast segments forming the mast; (b) connecting the upper and lower trolley to the mast; (c) adding mast segments one by one in an upward trajectory; (d) strapping each mast segment to the climbing object using a strap; (e) moving the upper trolley to a desired location followed by engaging the brake of the upper trolley to hold in place; (f) raising the lower trolley and thus the platform assembly to a desired position up the mast followed by engaging the brake of the lower trolley to hold in place; (g) repeating steps (e) and (f) until a desired height is reached; (h) optionally securing a harness to the upper trolley through a harness connection point for added safety at step (b); (i) optionally using a motorized unit connected to the upper trolley to move up and/down the lower trolley and thus the platform of step (f).

The present disclosure further provides for a harness for a climber that includes a modification to accept attachment of any of the previously described apparatus. The harness includes a folded platform and mast segments for carrying.

For purposes of summarizing the disclosure, certain aspects, advantages, and novel features of the disclosure have been described herein. It is to be understood that not necessarily all such advantages may be achieved in accordance with any one embodiment of the disclosure. Thus, the disclosure may be embodied or carried out in a manner that achieves or optimizes one advantage or group of advantages as taught herein without necessarily achieving other advantages as may be taught or suggested herein. The features of the disclosure which are believed to be novel are particularly pointed out and distinctly claimed in the concluding portion of the specification. These and other features, aspects, and advantages of the present disclosure will become better understood with reference to the following drawings and detailed description.

BRIEF DESCRIPTION OF THE DRAWINGS

The figures which accompany the written portion of this specification illustrate embodiments and method(s) of use for the present disclosure constructed and operative according to the teachings of the present disclosure.

FIG. 6A-6C an example platform assembly in a folded compact configuration.

The various embodiments of the present disclosure will hereinafter be described in conjunction with the appended drawings, wherein like designations denote like elements.

DETAILED DESCRIPTION

Figure 1:
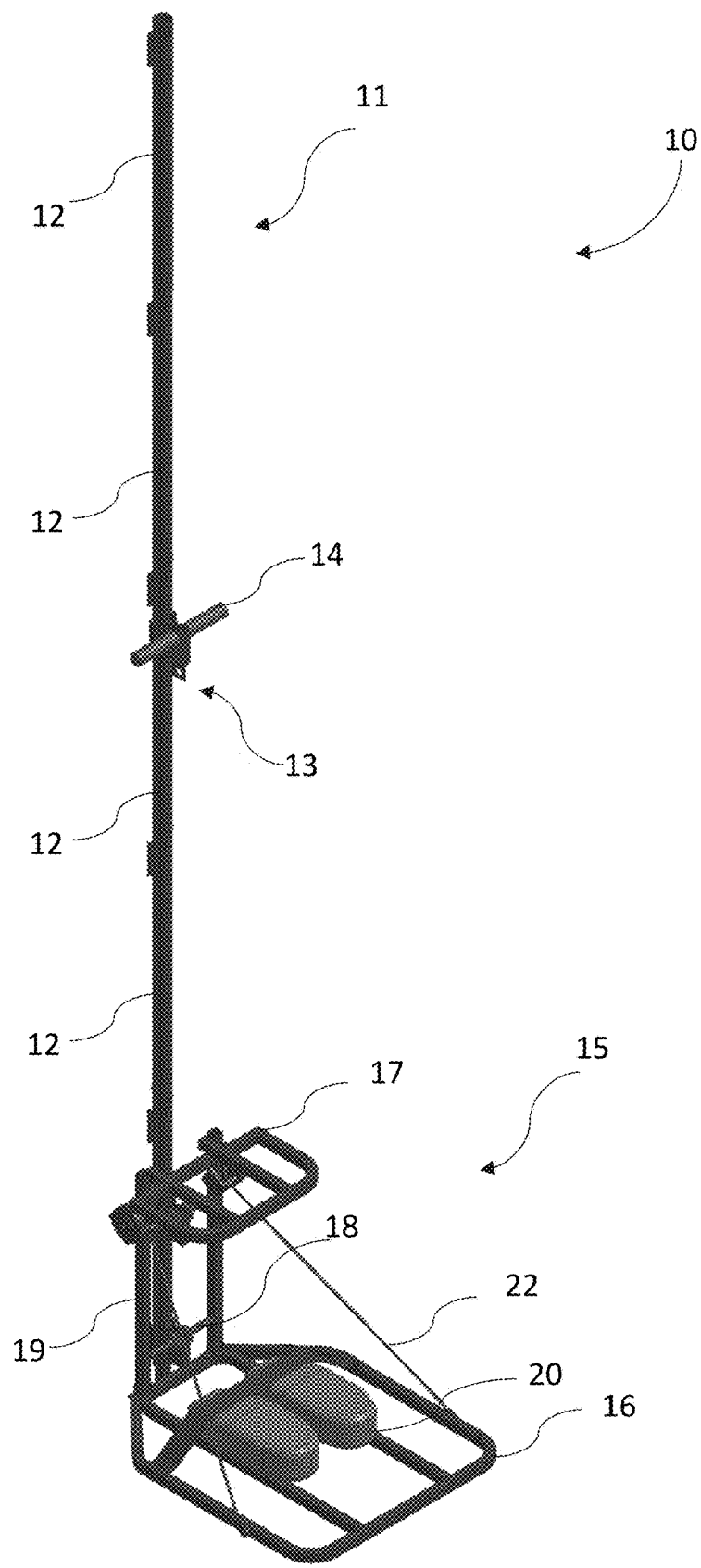
FIG. 1 illustrates a climbing apparatus according to the present disclosure.

The present disclosure provides for a system and a climbing apparatus used to aid a person in scaling a vertical member or climbing structure such as a tree or pole. In an example, the climbing apparatus is comprised of a multi-piece mast and trolley system. The mast can be broken down into a plurality of detachable mast segments that stack and secure to each other to allow for a vertical accent. The trolley then follows and securely slides up the mast. In an example, the trolley portion is modular and load bearing. The trolley should be made operable to support multiple embodiments to be used individually or as a system. The trolley or set of trolleys should be constructed to support a user (i.e., a climber), a handle, a supporting rail (shooting rail), a seating assembly, and/or platform to support a climber. The trolley can have an integrated or separately adapted guide feature to keep the trolley restricted to following a mast. The trolley can include mechanical or electro-mechanical braking, binding, or latching function to control the ascent or decent of the climber. The system often includes at least one upper trolley and at least one lower trolley. The upper trolley can also support attachment of a climbing harness and/or repelling gear. A platform trolley can further be provided to give support to broken down mast sections and/or gear. The mast segments can be taken apart to allow for folding to create a compact shape for easy packing and handling. Further attachments are equipped to accommodate shoulder and hip straps for back packing comfort. In yet another form of the present disclosure, a platform, handle, and/or supporting rail trolley are provided that can be equipped with a padded seat for added comfort and/or convenience.

In this example, the mast includes a plurality of mast segments that can be disassembled and compact easily together to promote packing convenience. Mast segments are typically elongated metallic, alloy, and/or plastic/composite members that define by various cross sections for supporting the trolley. Two detachable mast segments can be combined by inserting a reduced cross section end, also referred to as a tapered end, of one mast portion into a standard cross section end of a second mast portion. This forms mating ends with a male and female end portions sized and shaped to provide a stackable mast segment. This can be repeated until a desired climbing height is reached and thus forming a climbable mast. Each mast segment has a support piece for attachment to a vertical member or climbing object existing at the standard cross section end. Optionally, a singular hole opposite of the support piece can be used as a fail-safe preventing trolley travel past a final portion.

In an example of operating the climbing apparatus of the present disclosure for hunting or climbing a tree, the detachable mast segments offer a benefit. Having detachable and sometimes shorter mast segments to form an elongated vertical mast allows for climbing of a variety of trees including ones considered "imperfect" of varying diameter and straightness. This allows for a tree selection that offers other advantages like better concealment or hiding.

The present disclosure provides for using a hand trolley and platform trolley together along the mast. This allows for a climber to scale a vertical member, such as tree or otherwise. The platform is adapted to support the climber's weight while the hand trolley is advanced along the mast. The hand trolley supports the weight of the climber (and any belongings carried by the climber) while the platform trolley is advanced upward. In a further example, the apparatus can be designed for self-advancement through the utilization of an electro-mechanical system.

Referring to FIGS. 1-31, a plurality of climbing systems and apparatuses associated with the present disclosure are shown. The following parts list is provided to assist in understanding the Figures and schematics provided:

10—Climbing apparatus/system
11—Mast
12—Mast segments (which can be a tube of a hallow body having openings sized and shaped for stacking)
12A—Upper end of mast segment (opening sized to receive tapered lower end 12B of an adjacent mast segment 12)
12B—Lower end of mast segment (having a tapered end for mating and nesting securely fitting within an upper end 12A of an adjacent mast segment 12)
13—Upper trolley
14—Handle, also referred to as Hand rail (brake actuation)
15—Stand assembly
16—Platform
17—Seat
18—Lower trolley
19—H frame (adds stability) connects seat to platform
19A—Single post frame
20—"Virtual feet"
21—Foot strap (Belt)
22—Support cables
23—Tapered section for inserting into opening of adjacent mast segment
24—Standoff (tree or the like)
25—Over travel hole
26—Slide fob (creates added adjustability (for example, about 2 inches))
27—Space between mast segment and standoff
28—Brake mechanism
28A—Hydraulic brake
28B—Radial brake
28C—Translation brake
28D—Latch brake
28E—Leverage brake
29—Brake housing
30—Body/Chassis (surrounds and engages mast segments)
30A—First rounded body portion
30B—Second rounded body portion
31—Brake pad (internal, engages mast upon actuation)
32—Slide (creates offset to allow for movability)
32A—Wheels to allow for movability (alternative to Slide of 32)
33—Over travel catch
34—Parking brake handle (circular, manually engages with added force)
35—Emergency brake handle (generates binding force against mast; optional)
36—Platform level handle
37—Platform anti-tilt bracket with detent
38—Tilt bracket
38A—Tilt opening to allow for adjustability
39—Universal mounting bracket
40—Seat/saddle
40'—Strap seat
42—Electric motor assembly/unit
43—Tripod accessory
44—Tripod base members
44A—Distal end of base member
45—Tripod extension cables
45A—Cable tensioner
46—Set-up tube braces
47—Harness attachment point
48—Motor housing
49—Control panel with up, latch engagement, and down push buttons
50—Battery housing
51—Planetary gear train (×4)
52—Cable drum
53—Set-up assist handle
53A—Set-up assist tube
54—Stake hole
111—Mast cap
112—Ladder catch
112A—narrower end that nests with an upper section of 112
113—Ladder trolley assembly
114—Ladder catch handles
115—Tilt bracket
116—Catch
119—Parallel and spaced part squared rails hat extend upward
120—Spacer for abutting against tree or another object
121—Horizontal bridge segment
153—Motor
154—Electromechanical release of locking mechanism 170—Ribs for controlling stand rotation, spaced apart slots allow for reduction in tube rigidity for added flexibility.
190—Hinged connection point that mates with 191 (one male, one female)
191—Hinged connection point that mates with 190
211—Reinforcement ring for structural support
212—Rectangular latch
213—Latch trolley
214—Latch handles
215—Latch features
216—Latch spring
217—Latch release
219—Latch rails
221 Reinforcement ring for structural support and added strength
225—Latch holes
300—Telescoping ladder assembly
310—Ladder segments
320—Support braces
400—Leverage type climbing assembly
410—Leverage type rectangular mast
420—Leverage style climbing arm
422—Distal end of arm 420
424—Protruding catch
T—Tree/Climbing object The present disclosure provides for a portable and collapsible climbing system, assembly, and apparatus operable to assist in reaching a higher vantage point which is useful and advantageous for sports like hunting. In one example, a climbing apparatus 10 includes a mast 11 adjustably connected to a stand platform 15 and a hand trolley 13. Mast 11 extends upwardly from a base level, typically the ground. Mast 11 is fabricated from material strong enough to support a platform assembly 15, a user of apparatus 10 (i.e., a climber), and any equipment carried by the user. A total weight of a user, equipment, and the platform assembly may exceed 200 lbs. and in some circumstances, the total weight exceeds 300 lbs. Mast 11 can be fabricated from a material selected from the group consisting of metal (steel, steel alloys, aluminum, aluminum alloys, etc.), plastic, composite materials, and the like.

Mast 11 is formed of detachable mast segments 12 that connect vertically in a relatively linear progression upwardly. Segments 12 can be fixed, as shown in FIG. 3A or adjustable as shown in FIGS. 3B and 3C. Segment 12 extends from an upper end 12A to a lower end 12B. Segment 12 generally includes a hallow body portion or tube and a tapered connector section 23 positioned at lower end 12B. Tapered section 23 is sized and shaped to insert and nest with a mating opening formed at an upper end 12A of an adjacent segment 12. In an example, the opening formed in upper end 12A is about 1.5 inches in diameter. Accordingly, the individual segments 12 can be stacked one on top of another to form a vertically extending mast 11. In this example, segment 12 is cylindrical or rounded providing a circular cross section. However, as shown in FIGS. 12-18, a plurality of mast configurations is shown and sufficient to achieve the benefits associated with the present disclosure.

Figure 28:
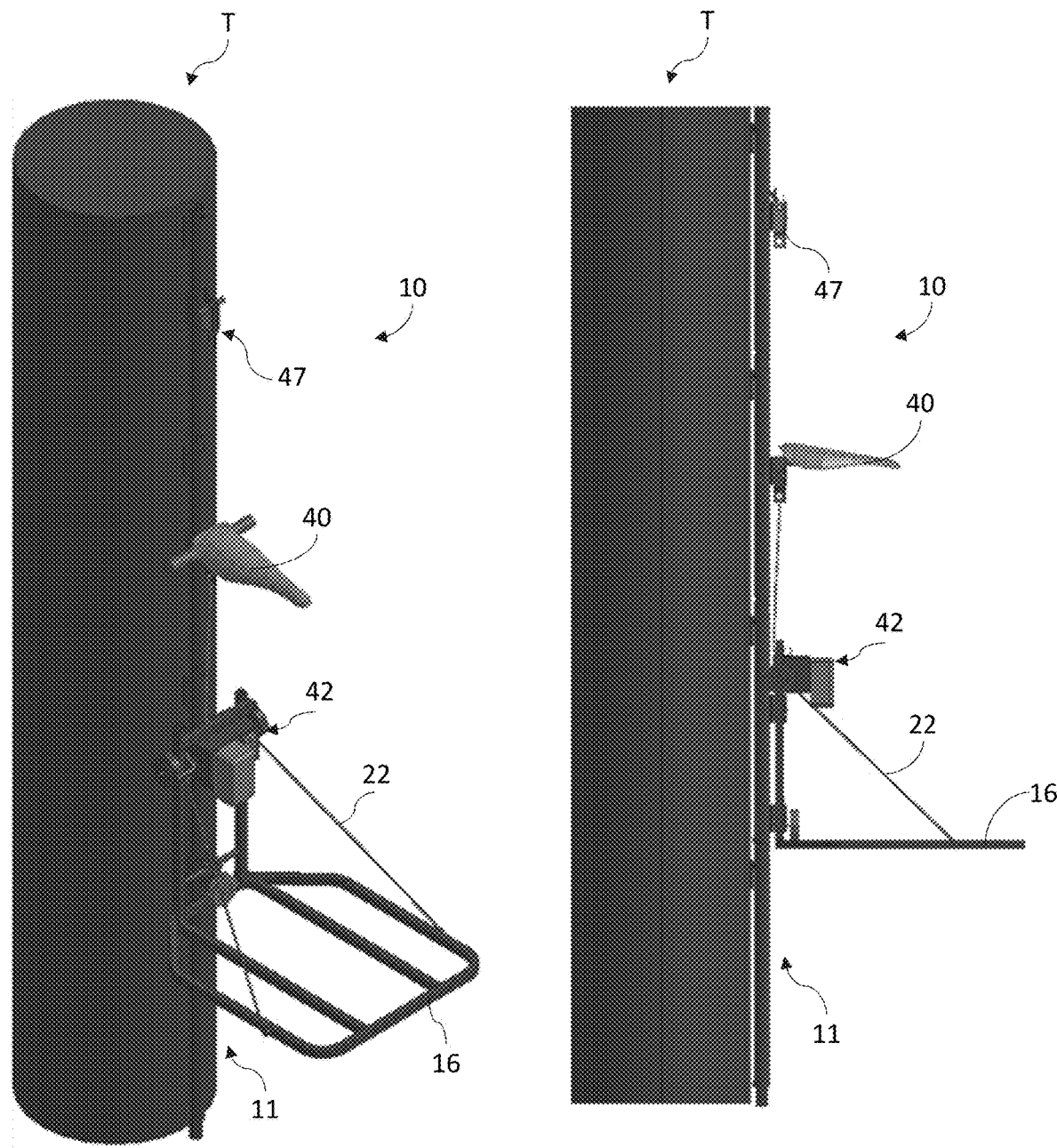
FIG. 28 illustrates an example climbing apparatus of the present disclosure positioned against a climbing object or tree.

As shown in FIGS. 3A-3C, segment 12 includes a standoff 24 that extends radially from mast section 12 near the upper end 12A. Standoff 24 abuts a designated climbing object, such as a tree or other structure, and forms a relatively small space 27 between the object and the mast 11. This allows for straps (not shown) to secure around the object and through the space 27 thereby securing mast 11 in an upright position to allow for climbing. FIG. 28 illustrates a schematic of an example apparatus 10 positioned against an example climbing object T which can be a tree, pole, or the like. Mast segment 12 further includes an over travel hole 25 that allows for receiving a catch or securing feature of a corresponding trolley 13, to be discussed in greater detail below. The over travel hole 25 is formed at or near the upper end 12A of the segment 12.

In this example, mast 11 is formed of a plurality of mast segments 12 defining a length of about 24 inches. Each segment 12 is stacked on top of an adjacent segment 12 through a tapered connection 23 inserted into the opening formed at upper end 12A. FIG. 3A shows a fixed tapered section 23. However, FIGS. 3B and 3C show an adjustable tapered section 23. In this example, the adjustability is about 2 inches. The adjustability is managed using a slide fob connected to section 23 that moves up and down. This allows for additional customization and maneuvering around branches or obstacles. It also promotes the removal of just one segment 12 from any position without needing to disassemble the entire mast 11.

Figure 2:
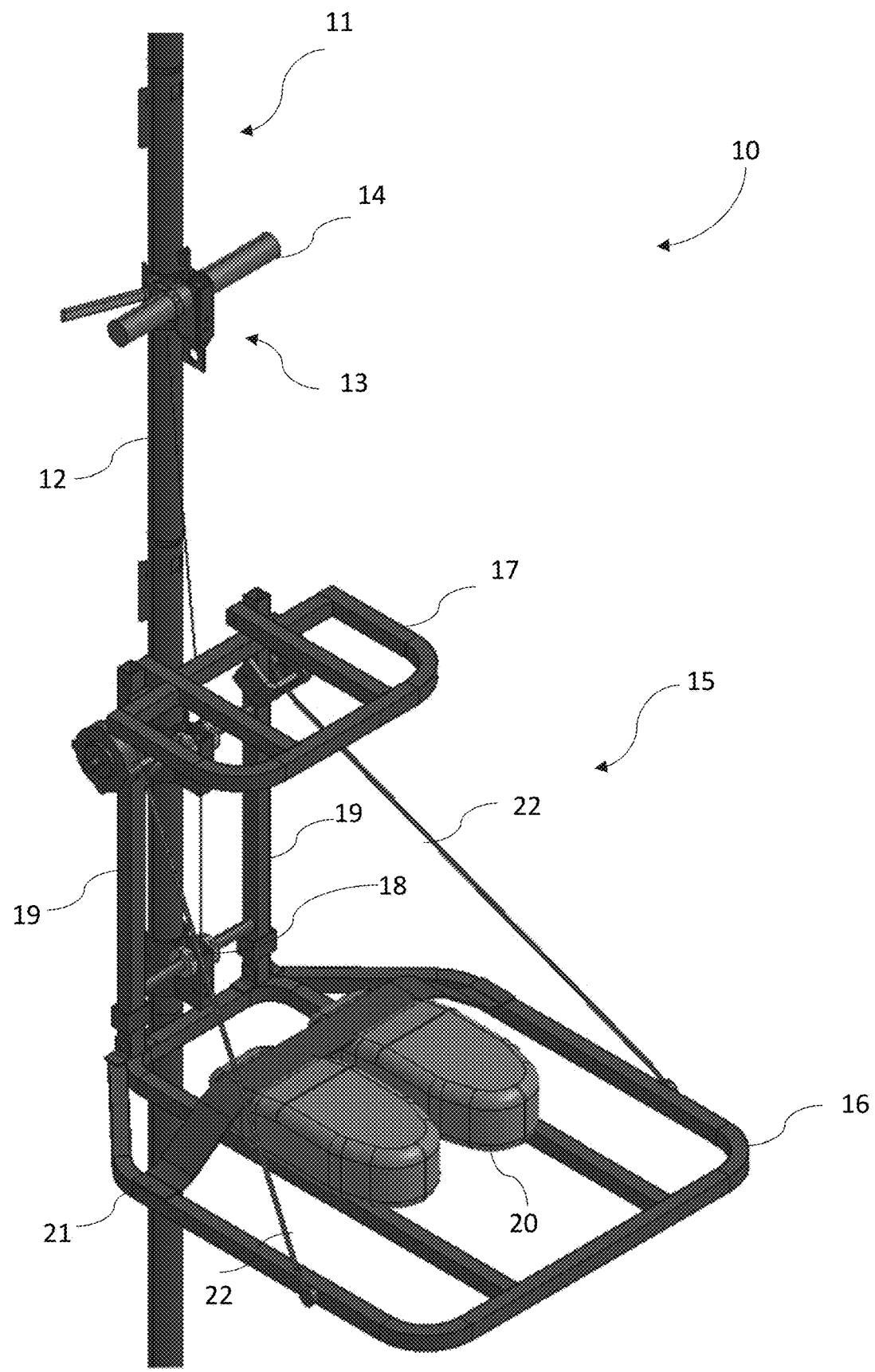
FIG. 2 illustrates of the climbing apparatus of FIG. 1 with a platform assembly positioned up the mast.
Figure 3:
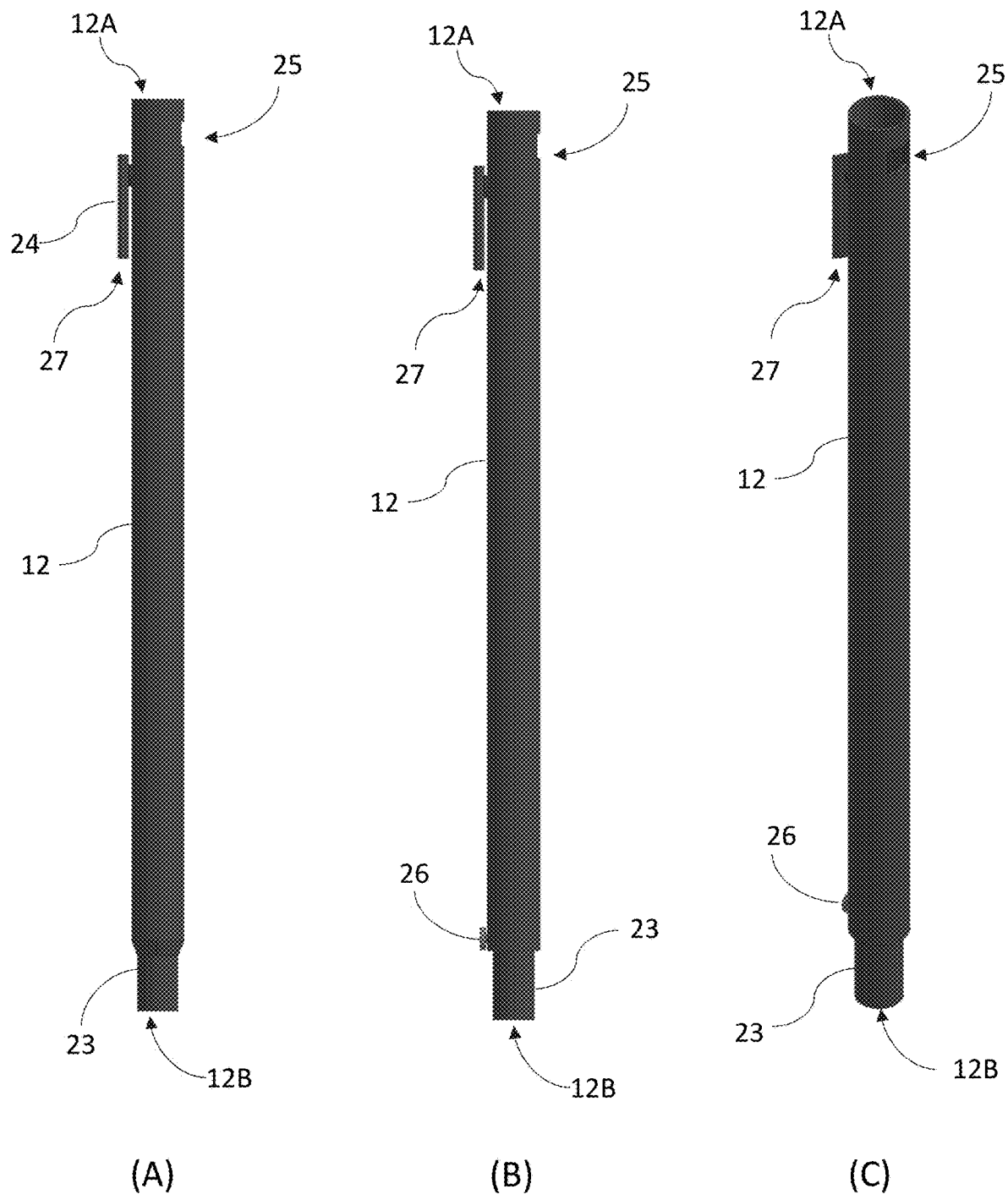
FIG. 3A-3C illustrate example mast segments according to the present disclosure.
Figure 4:
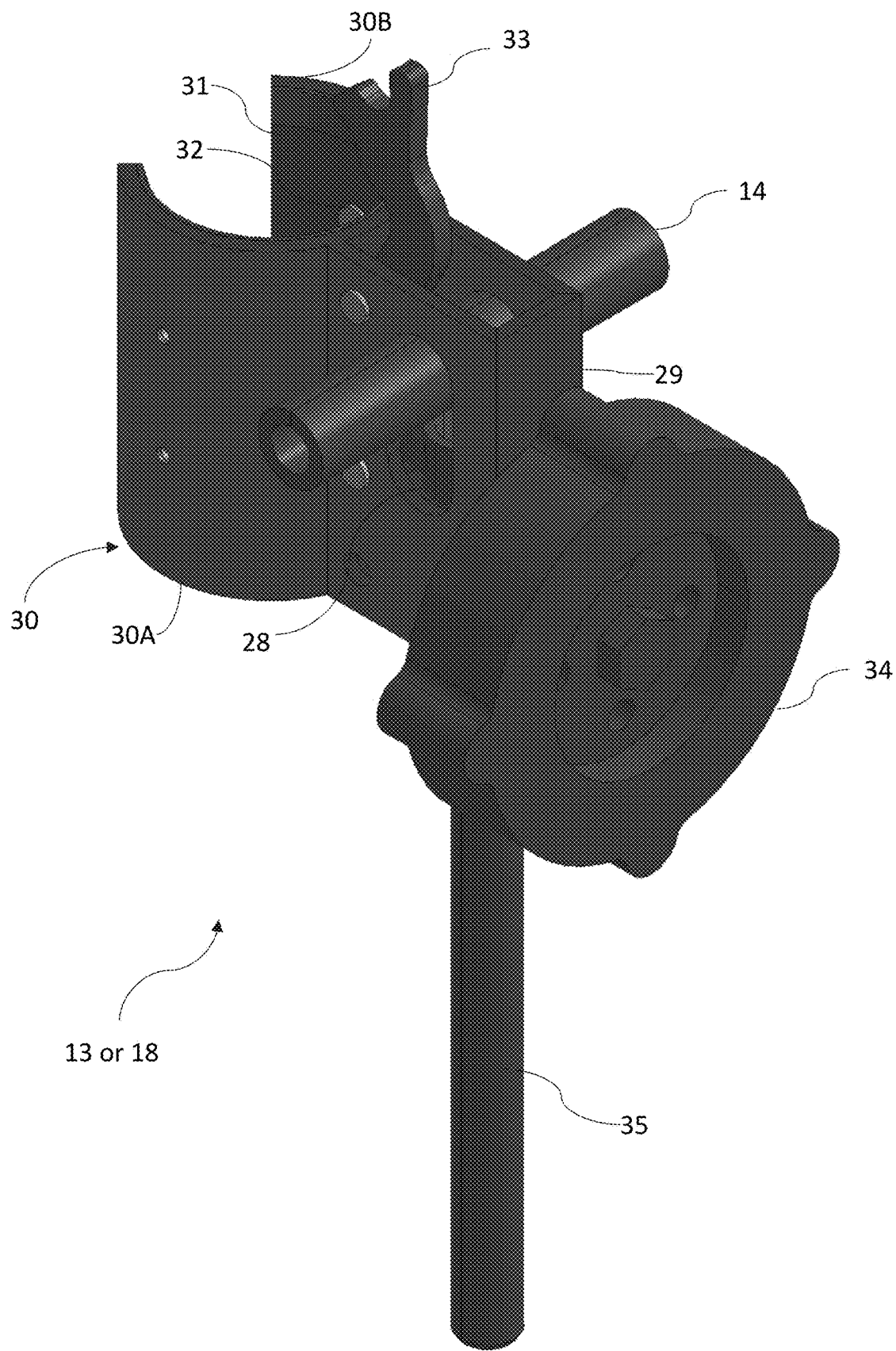
FIG. 4 illustrates an example trolley and brake assembly according to the present disclosure.

Apparatus 10 further includes at least one trolley 13 operable for moving up and down along mast 11. Trolley 13, as shown in FIG. 4, includes a braking mechanism 28 for engaging mast 11. This allows the trolley 13 to move upward or downward along trolley 11 and stop as determined by the user. In the example of FIGS. 1 and 2, trolley 13 is an upper trolley. A lower trolley 18 is further provided below and connected to platform assembly 15. Upper trolley 13 and lower trolley 18 can operate independently relative to each other allowing the user to adjust one trolley while holding the other secured to mast 11. Trolley 13 includes a handle 14. In this example, handle 14 extends horizontally and perpendicular to a longitudinal axis defined by mast 11 and passes through a brake housing 29. This allows for convenient gripping and handling by the user. The handle 14 also functions as a brake actuator by engaging the brake mechanism 28 when at rest. If a user wants to move the trolley 13 up or down, the handle merely needs to be pushed in that direction allowing the brake mechanism to disengage from the mast 11.

As shown in FIG. 4, trolley 13 can further include a manual brake handle 34 which serves as a redundant braking safety feature. In this example, the manual brake handle 34 is circular and allows for engaging (gripping and tightening by the user) of the brake with added force to secure the trolley 13 to the mast 11. Brake handle 34 functions independently from the braking handle 14 to serve as an extra precaution in case the braking handle 14 fails as one aspect. Trolley 13 further includes a brake body 30 formed of an internal brake pad 31 for engaging and locking with a mast 11, a first rounded body portion 30A and a second rounded body portion 30B. Brake pad 31 extends on an interior of first and second body portions 30A and 30B and made from a material sufficient to grip and lock the trolley 13 to mast 11. An opening is formed between first and second body portions 30A to allow for trolley 13 to move upward from segment 12 to upper segments 12 without interference from the stand offs 24 or straps (not shown). Trolley 13 further includes an over travel catch 33 (spring actuated) for engaging with the over travel hole 25 of the mast segments 12. The over travel hole is blocked by 23 when an additional mast segment 12 is added in sequence and then disengages or prevents the over travel catch. Effectively, the over travel catch 33 is spring loaded and expands into the over travel hole 25 when aligned those causing the trolley 13 to stop in place. When handle 14 is actuated, the brake mechanism 28 deactivates to allow for further movement along mast 11, causing the over travel catch 33 to compress the spring allowing movement up the shaft until another over travel hole 25 is reached. To disengage from the over travel hole 25, the trolley 13 can be lowered causing the spring to compress of the over travel catch. An additional segment 12 is then connected which blocks the over travel hole 25 to allow the trolley 13 to move upward to a next over travel hole 25.

Figure 5A:
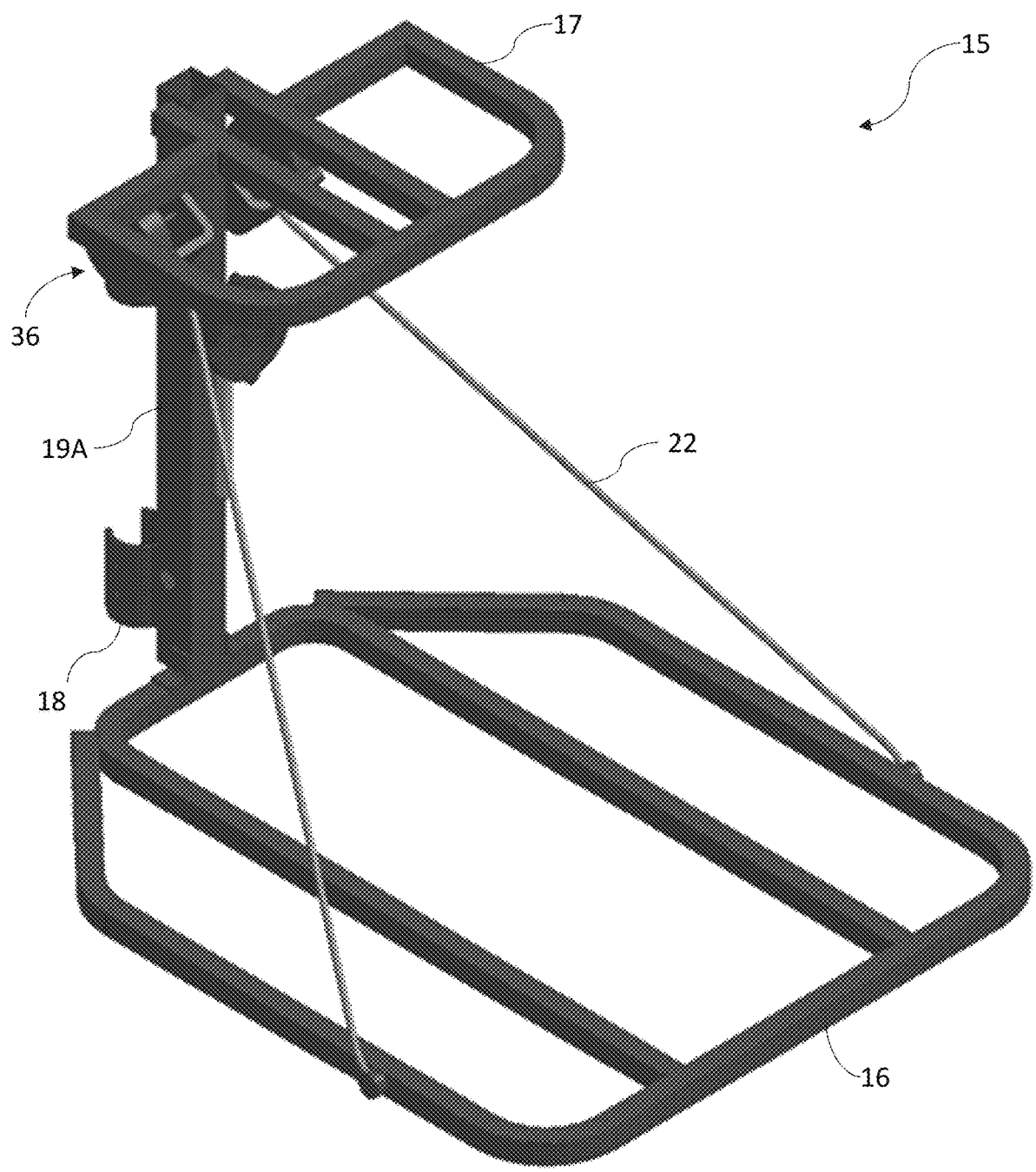
FIG. 5A-5B illustrate example platform assemblies have a single post frame (5A) and an H-frame (5B).
Figure 5B:
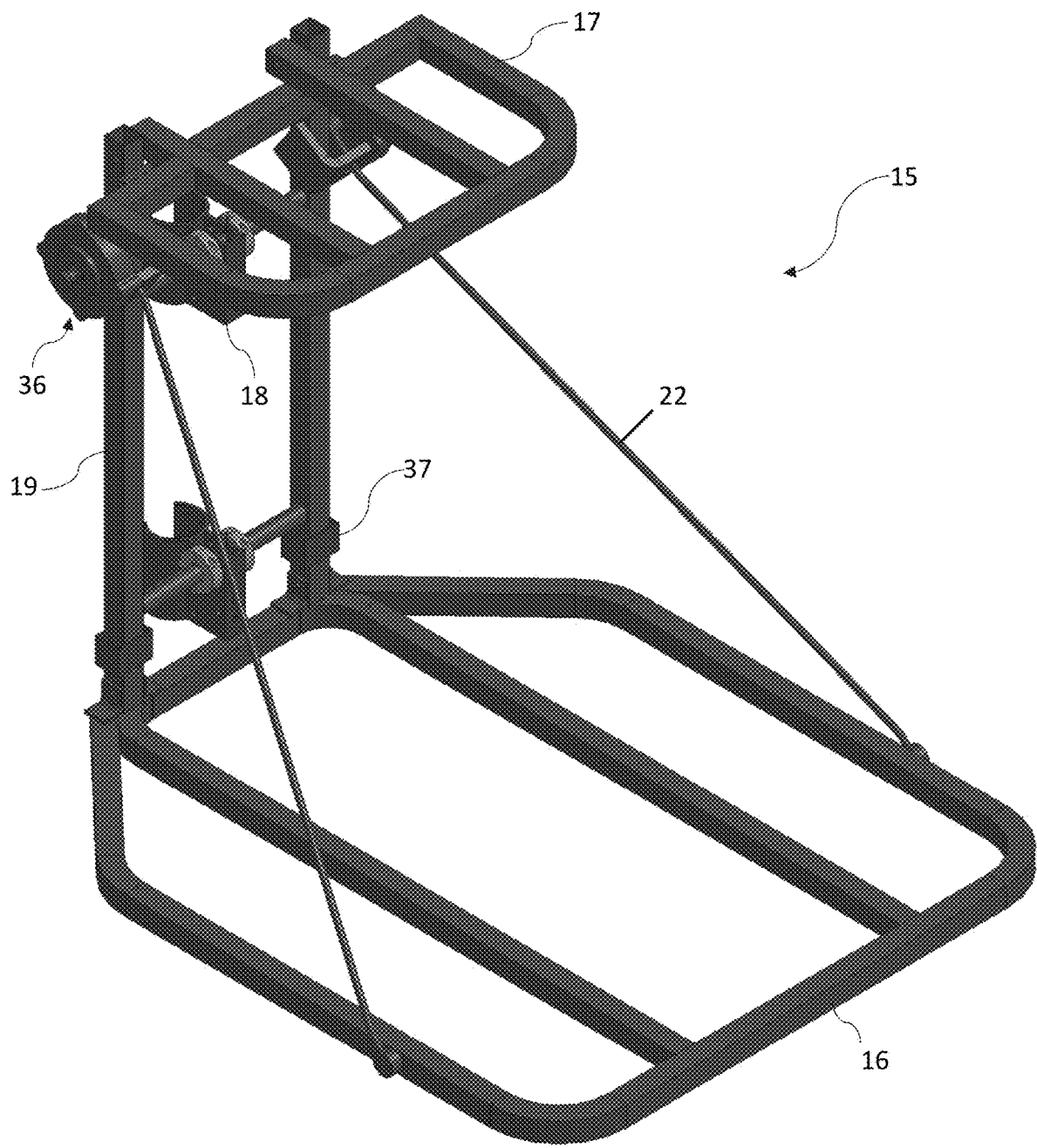

Climbing apparatus 10 further includes a platform assembly 15 having a platform 16 connected to a seat 17 through a frame 19. In one form, frame 19 can be an H-frame for added stability and support or a single post 19A as shown in FIGS. 5A-5B. Assembly 15 can be collapsible to allow for convenient folding, storing, and carrying. The seat 17 can rotate up into a foldable position (FIG. 7B) for stowing or to be out of the way during climbing. Seat 17 can be rotated to extend perpendicular and outward from mast 11 to allow for a user to sit down during use. The H-frame 19 extends downward from seat 17 and connects with platform 16 which is sized and shaped to allow for a user to stand on the platform 16. Frame 19 is attached to platform 16 to allow for folding, stowing, and carrying. A movable bracket 37 is provided where frame 19 attaches to platform 16 to prevent folding during the users climbing action. A strap 21 is provided to stretch across platform 16. The strap 21 is sized and shaped to go over a user's feet (virtual feet 20 shown in the Figures) and secure the user to the platform 16. Support cables 22 extend diagonally from a base portion of seat 17 to opposite outer rim portions of the platform 16 to allow for a platform leveling. The Support cables 22 are connected to a platform level handle 36 that can pull or release the cables 22 manually by the user. In this example, the platform level handle 36 is positioned just below seat 17.

Assembly 15 further includes a lower trolley 18 that effectively functions like upper trolley 13 having the same components such as a handle, a brake mechanism, and brake body connected to the mast 11. The lower trolley 18 is mounted to the H-frame and positioned between the support posts that form the H-frame.

During climbing, a user can secure their feet (virtual feet 20) to platform 16 by placing their feet 20 under the strap 21 and facing the mast 11. The user can manually raise handle 14 upwardly by disengaging the brake mechanism 28 of upper trolley 13 and sliding it upward along mast 11. When the trolley 13 stops either through braking action or by engaging the catch 33 into the travel hole 25, the user can then pull platform assembly 15 upward by temporarily holding their weight on trolley 13 with their hands and pulling the platform assembly 15 with their feet 20 until the platform locks into place on mast 11. This action is then repeated until a desired height along mast 11 is reached. The mast segments 12 are then added one by one as the user ascends upwardly. This process is reversed for coming down the mast 11. In this example, the upper trolley 13 and lower trolley 18 function independently with respect to each other and thus allow a degree of freedom for the user. Moreover, each time a mast segment 12 is added, a strap (not shown) can be used to secure mast 11 to the climbing object T. The apparatus 10 further allows for the user to secure their body to the mast 11 through a safety harness (not shown) connected to one or both trolleys.

Figure 6A:
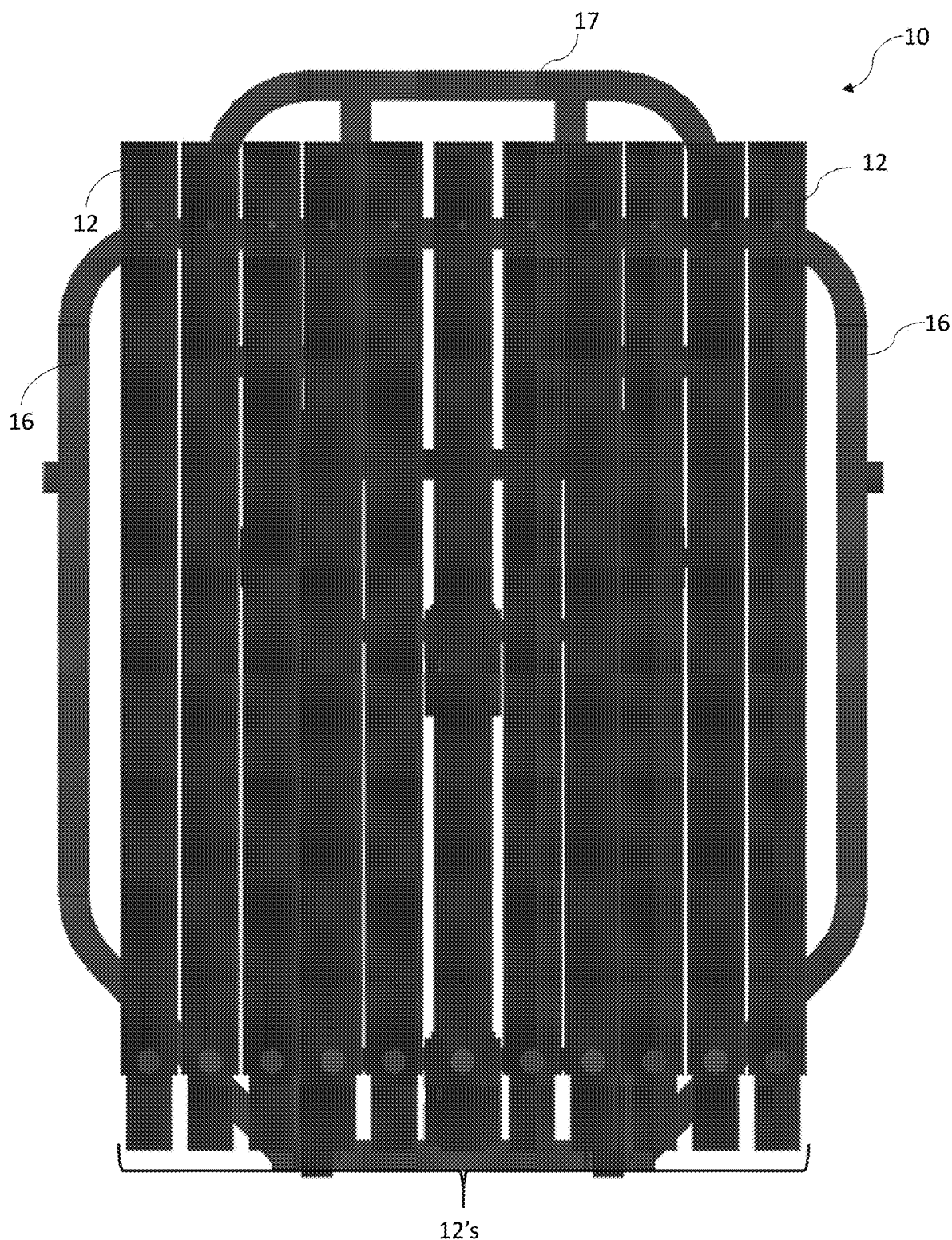
Figure 7:
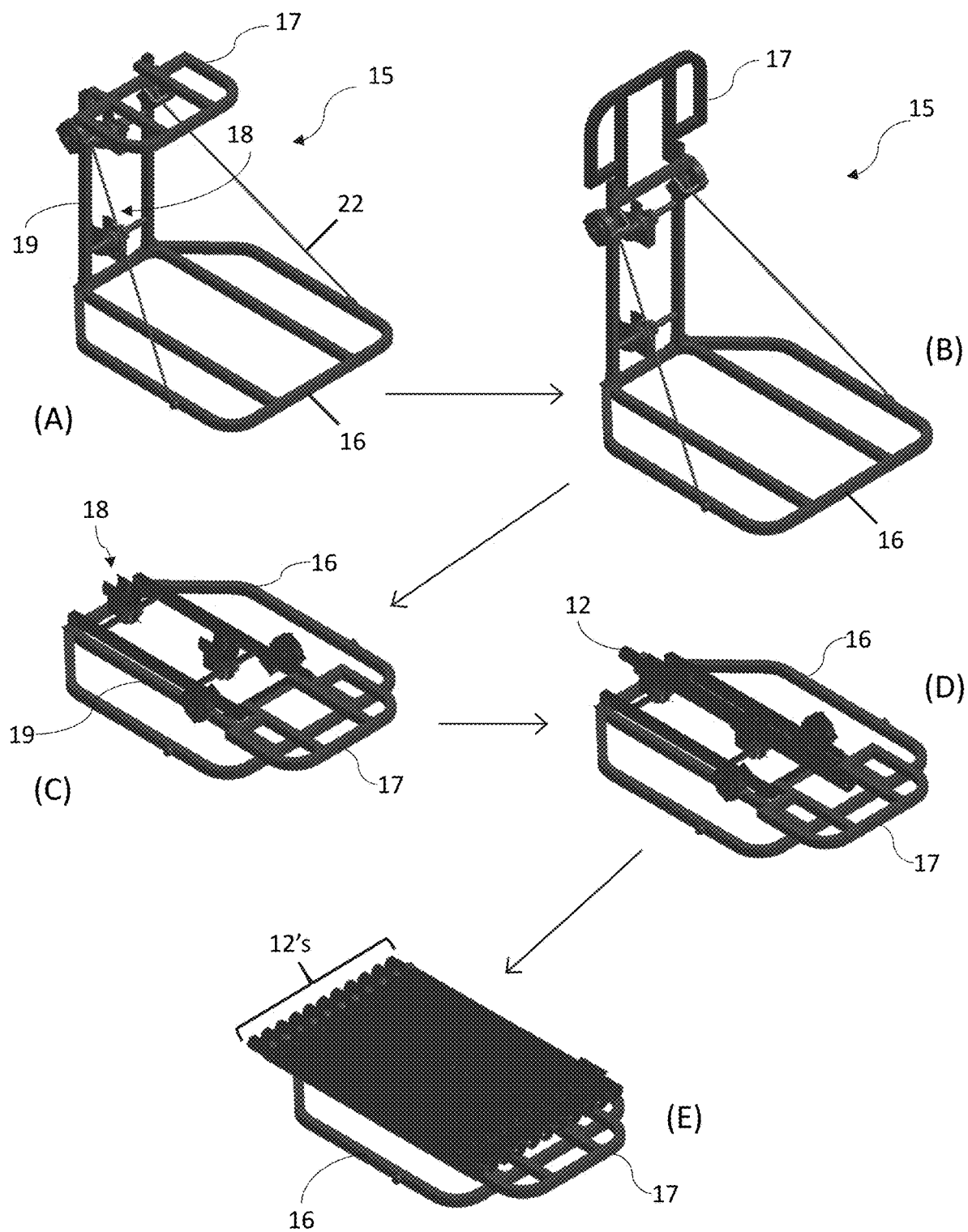
FIG. 7 illustrates various steps for folding the platform assembly into a compact configuration.

Referring to FIGS. 6A-6C and FIGS. 7A-7E, an example foldable and portable apparatus 10 is provided. FIG. 6A is a top face view of apparatus 10 in a foldable and storable configuration. In this example, the mast segments 12 have been "broken down" for stowing and are placed next to each other along a width of the platform. The platform assembly 15 is also folded down for stowing allowing the entire assembly to fold on top of itself. FIG. 7 shows the platform assembly folding down from seated configuration (FIG. 7A) to raising the seat 17 upward in FIG. 7B, to folding down H-frame 19 and seat 17 to fold over platform 16 in FIG. 7C. In this configuration, the brake body/chassis 30 is opened upward to allow for receiving at least one mast segment 12 (FIG. 7D). The remaining mast segments 12 can then be placed alongside each other forming a compact apparatus 10 for convenient stowing and carrying. In a top side view of FIG. 6B, the plurality of mast segments 12 are shown in a folded configuration with platform assembly 15. In this example, 11 mast segments are shown that spread across a width of about 21 inches. This is about the width of human shoulders. FIG. 6C shows a side view of the folded apparatus 10. In this example, the width of apparatus 10 in a folded configuration is about 5 inches and having a height of about 28.5 inches, essentially extending between a typical user's neck and hips. These dimensions allow for convenient carrying in a backpack, carrying device, or the like.

Figure 8A:
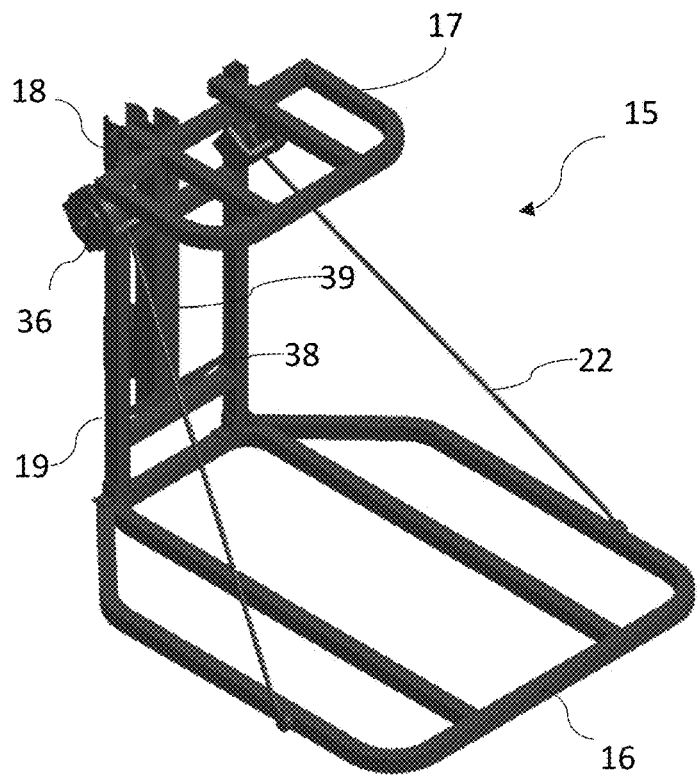
FIG. 8A-8C illustrate various features associated with an example universal mounting bracket and tilt guide plate.
Figure 8B:
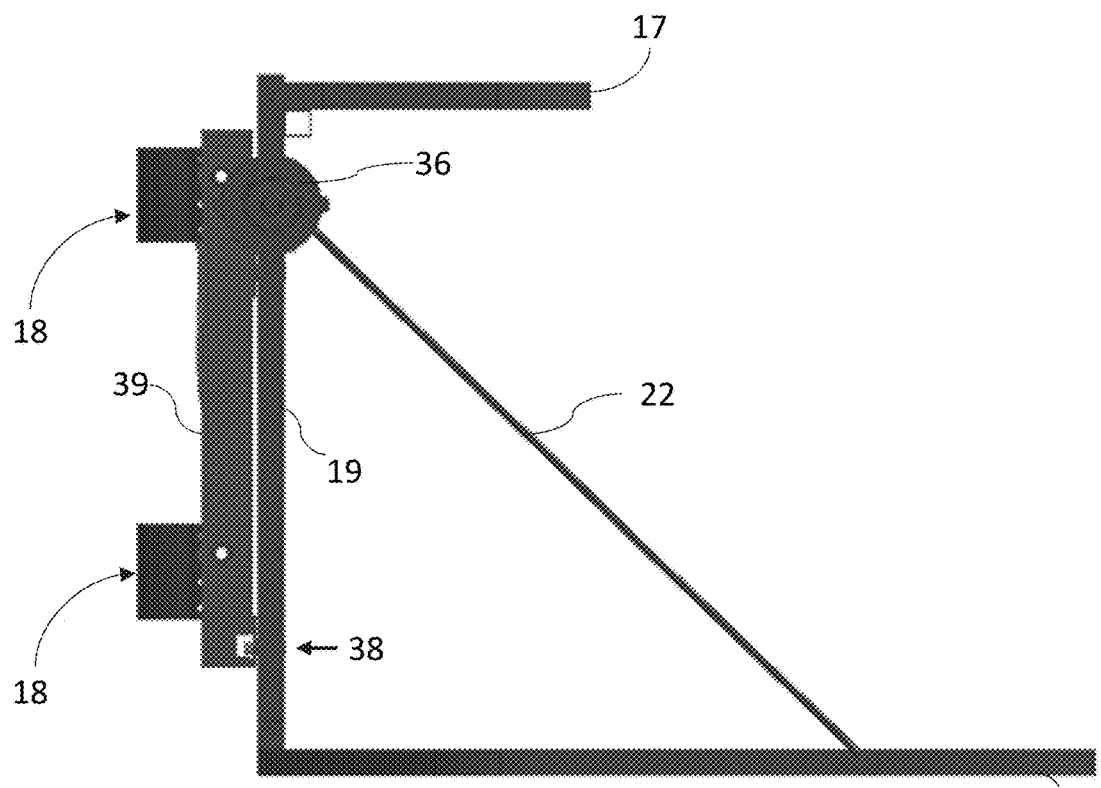
Figure 8C:
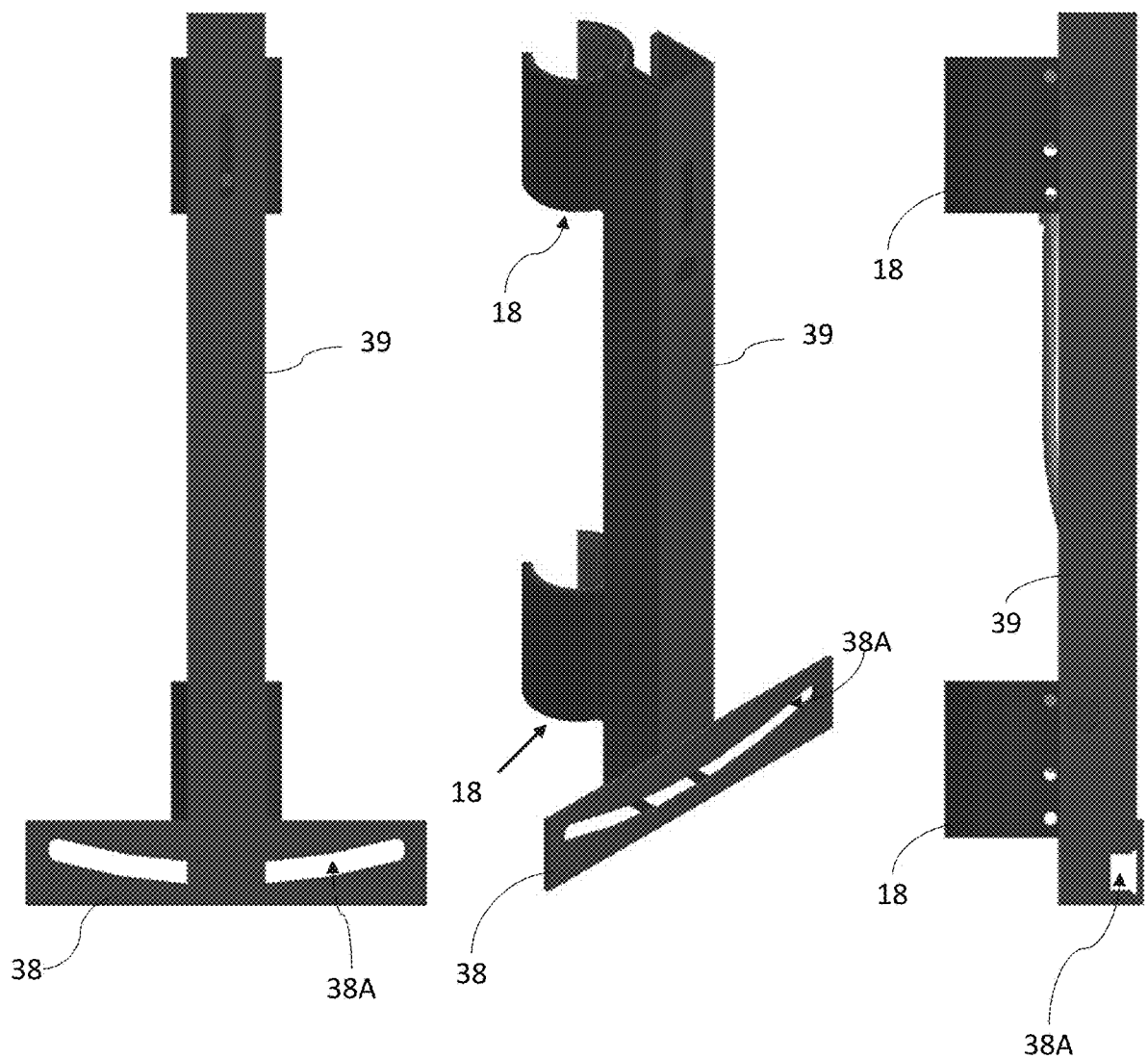

FIG. 8A-8C illustrate a further example apparatus of the present disclosure that includes a universal mount 39 and tilt bracket 38. The universal mount 39 includes a vertically elongated bracket member 39 having a trolley 18 mounted thereto. In this example, the universal mount 39 includes a pair of spaced apart trolleys 18. The trolleys 18 function together and provide support to the bracket and corresponding platform assembly. The universal mount 39 allows retrofitting any platform or seat assembly for climbing a mast 11. In this example, a tilt bracket 38 is also provided to allow for tilt adjustment of the platform and/or seat. An opening 38A is formed in the tilt guide plate 38 to allow for adjustability from side to side to make sure the seat/platform are properly level. As shown in FIG. 8A, universal mount 39 is operable to mount along the H-frame of a platform assembly 15.

Figure 9:
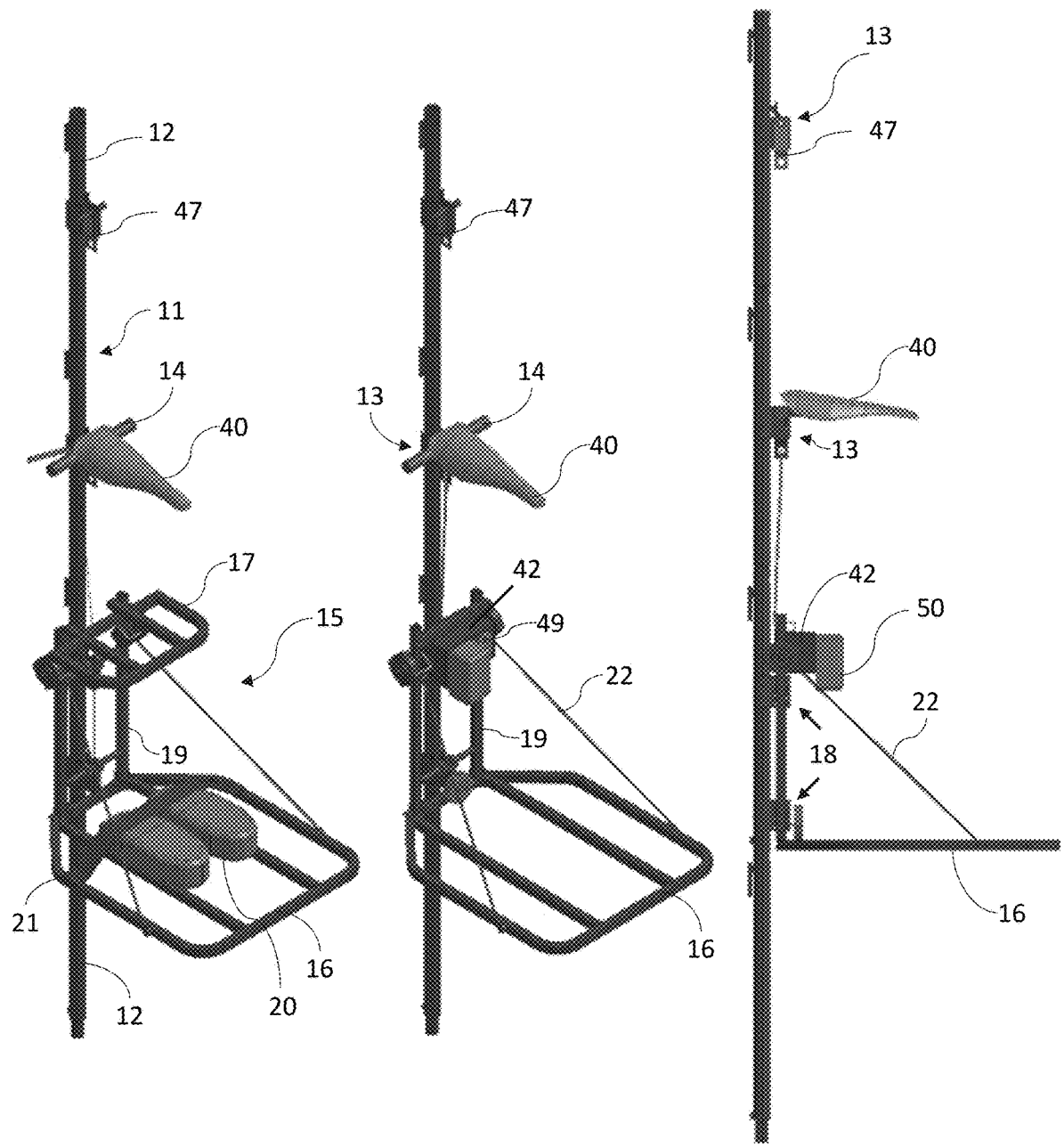
FIG. 9 illustrates an example climbing apparatus of the present disclosure having an electronic motor.
Figure 10A:
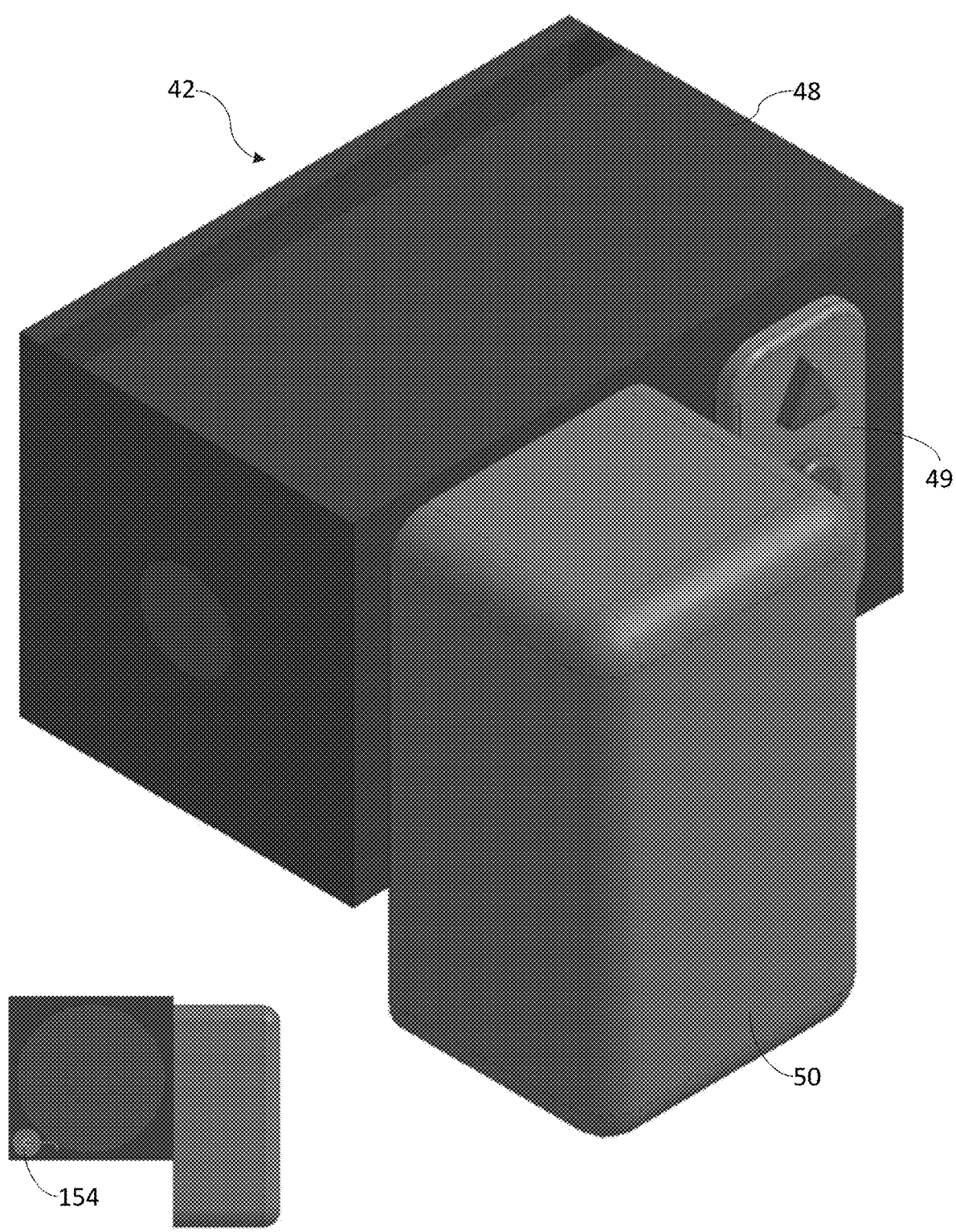
FIG. 10A-10B illustrate an example electronic motor and internal schematic.
Figure 10B:
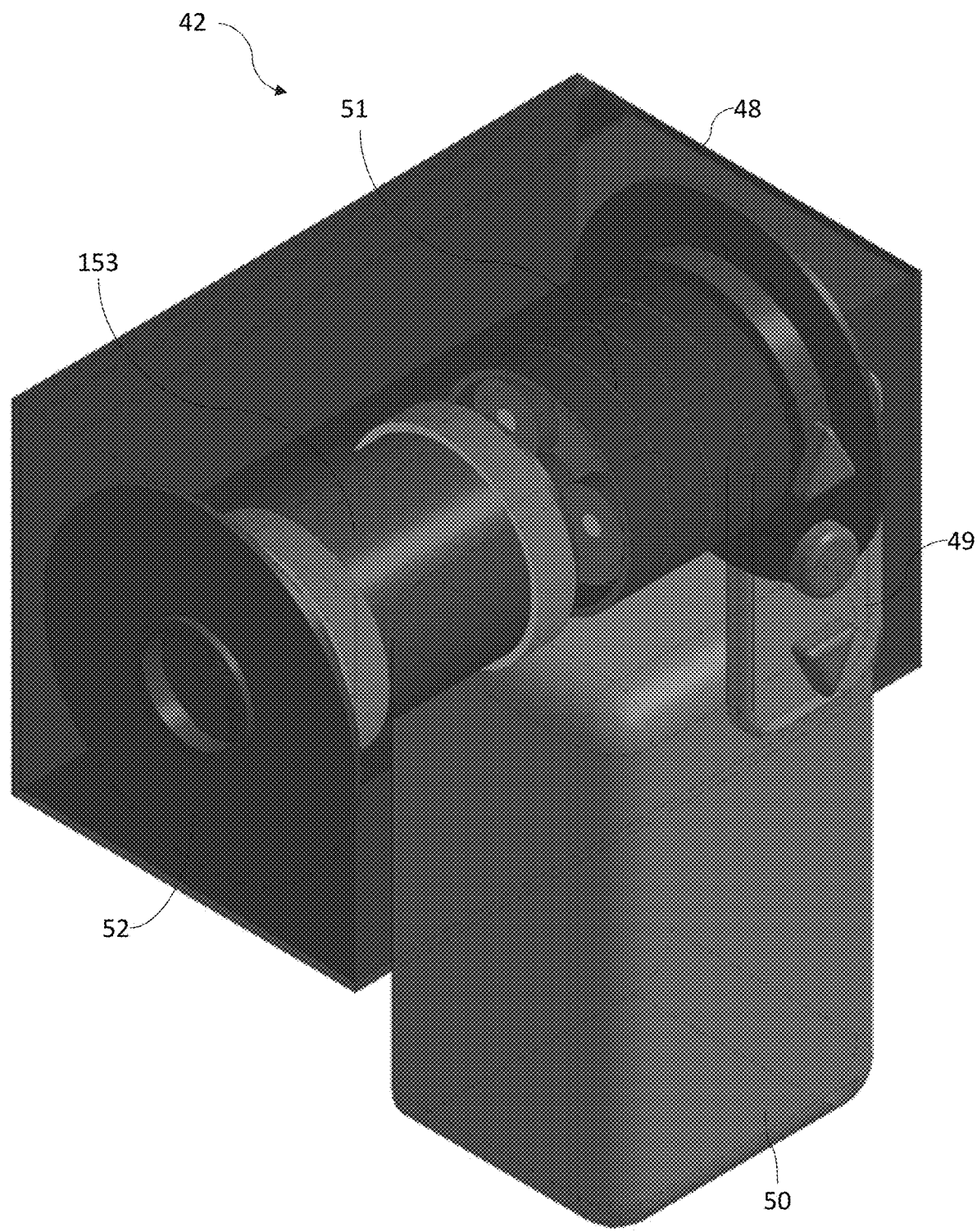

Referring to FIG. 9-10B, a further exemplary embodiment of an apparatus 10 is shown having a powered motor assembly 42. The powered motor 42 is configured to engage the lower trolley 18 and connect to upper trolley 13 via a cable, thus operable to move the platform assembly 15 up and down the mast upon actuation. In this example, motor 42 includes a motor housing 48 for housing a cable drum 52 and a planetary gear train 51 which drive a motor 153. A battery 50 is connected the motor 42 and is enclosed in a battery housing. Battery 50 is operable as a power source. The battery can be any suitable battery style operable to deliver enough power to drive motor 42. In a further example, battery 50 is rechargeable. A control panel 49 is provided with directional arrows/buttons for activating the motor 41 and causing the rising or falling of the trolley 18 along the mast 11. Additionally control panel 49 allows for wireless communication to a remote controlling device. Control panel 49 can optionally accommodate a power outlet for powering or charging an external device. The motor assembly 42 can further include a break release 154 which can be an electromechanical release of the locking mechanism.

In the example of FIG. 9, an optional bicycle seat/saddle 40 is shown as an alternate to a seating platform 17. The saddle 40 is connected to an upper trolley 13 and allows for variable and independent movement along mast 11. In another example, trolley 18 is connected to the electric motor 42 and moves along with it when the motor is activated. The electric motor 42 allows for a powered elevator configuration. In one form, the trolley 18, connected to the motor 42, is further connected to trolley 13. Motor 42 can be connected to trolley 13 via a cable. Once motor 42 comes close in proximity to 13 it can be stopped and braked. Then trolley 13 can be advanced by hand. Motor 42 can be activated again resuming ascension. Motor 42 is operable to operate like a winch and can be connected via a cable to an upper trolley 13.

In yet a further example, a harness attachment point 47 is shown positioned above the saddle 40 thus allowing for securing a user harness (not shown) to the mast 11. The harness attachment point 47 is mounted to another trolley to further allow for independent movement up mast 11. This embodiment shows that a plurality of trolleys can be utilized to move up and down the mast 11 for added climbing features and customization of apparatus 10.

Figure 11:
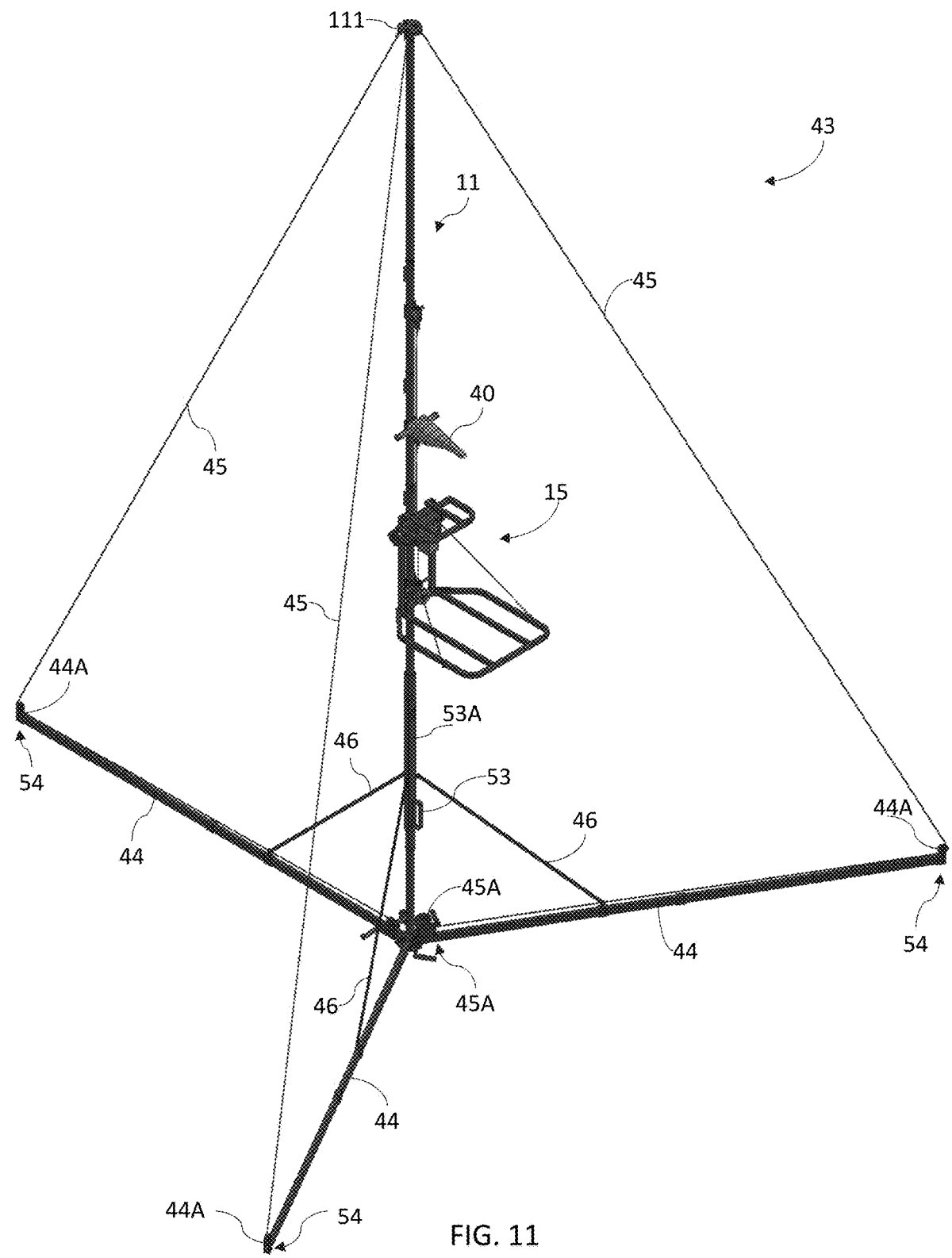
FIG. 11 illustrates a tripod accessory for use with the climbing apparatus of the present disclosure in the absence of a climbing object.

In yet another example, as shown in FIG. 11, a tripod accessory 43 is provided for independent climbing in the absence of a climbing object. Accordingly, the tripod accessory 43 at least three tripod base members 44 (i.e., extendable legs) extending outwardly from the mast 11 along the ground. In this example, base members 44 are positioned circumferentially equidistant from each other. At a distal end 44A of each base member 44, a tripod extension cable 45 is connected which extends upward to a single mast cap 111. Each base member 44 is further connected to a set-up tube brace 46 that connects and braces a lower portion of the mast 11 to the base member 44. The tripod accessory 43 further includes a cable tensioner 45A for controlling cable 45 length and tension. The mast cap 111 can include a spring tensioner to ensure cable 45 tension from the base members 44 to the mast 11. A set-up assist handle 53 and set-up assist tube 53A are connected to the set-up tube braces 46 to engage the mast 11 assist with adding or removing mast sections 12. A stake hole 54 is provided at each distal end 44A to secure the base members to the ground.

Figures 12, 13, 14:
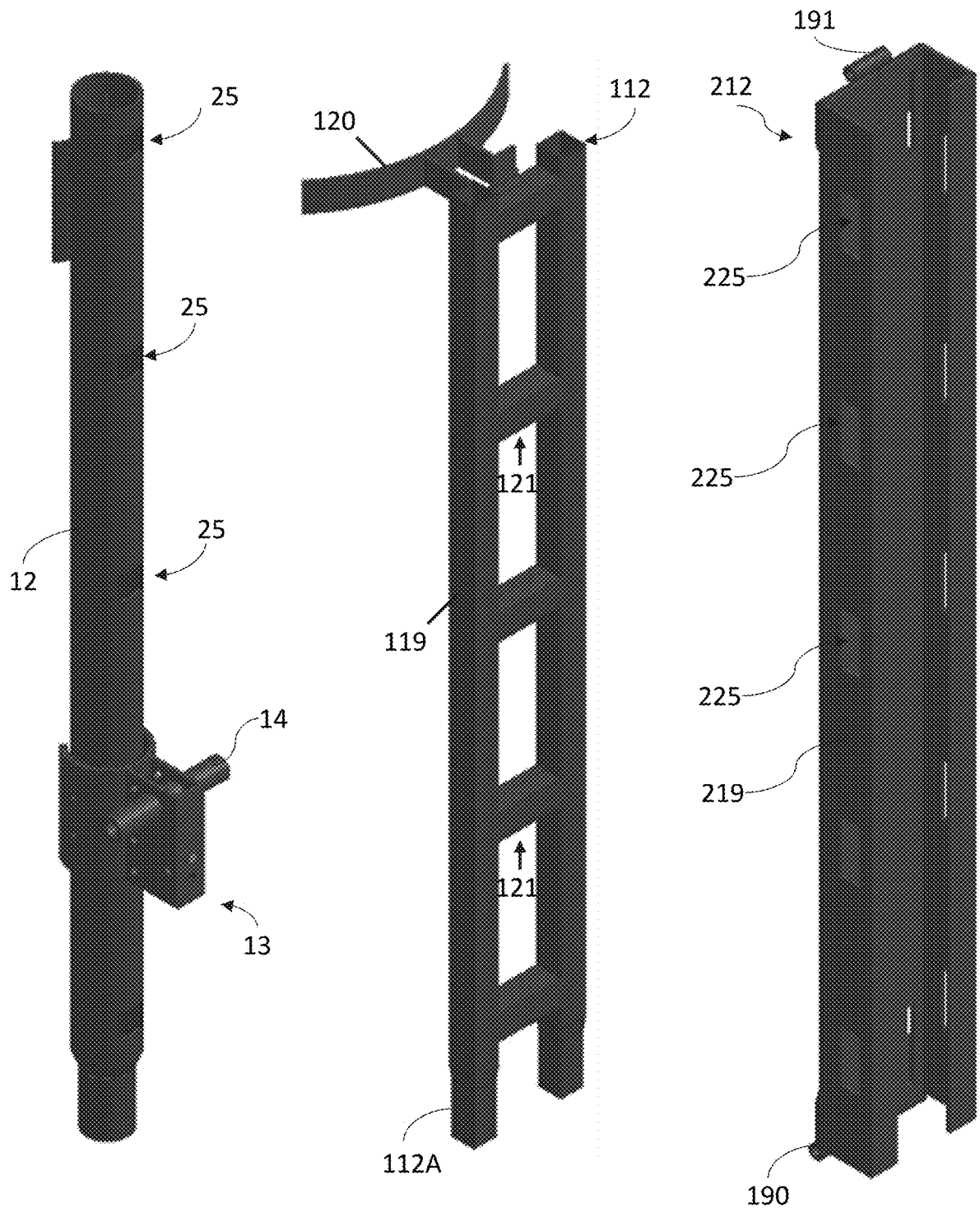
FIG. 12 illustrates an example cylindrical latch style mast segment and related trolley from FIG. 23 assembled.
FIG. 13 illustrates an example ladder style mast segment.
FIG. 14 illustrates an example rectangular latch style mast segment.
Figure 15:
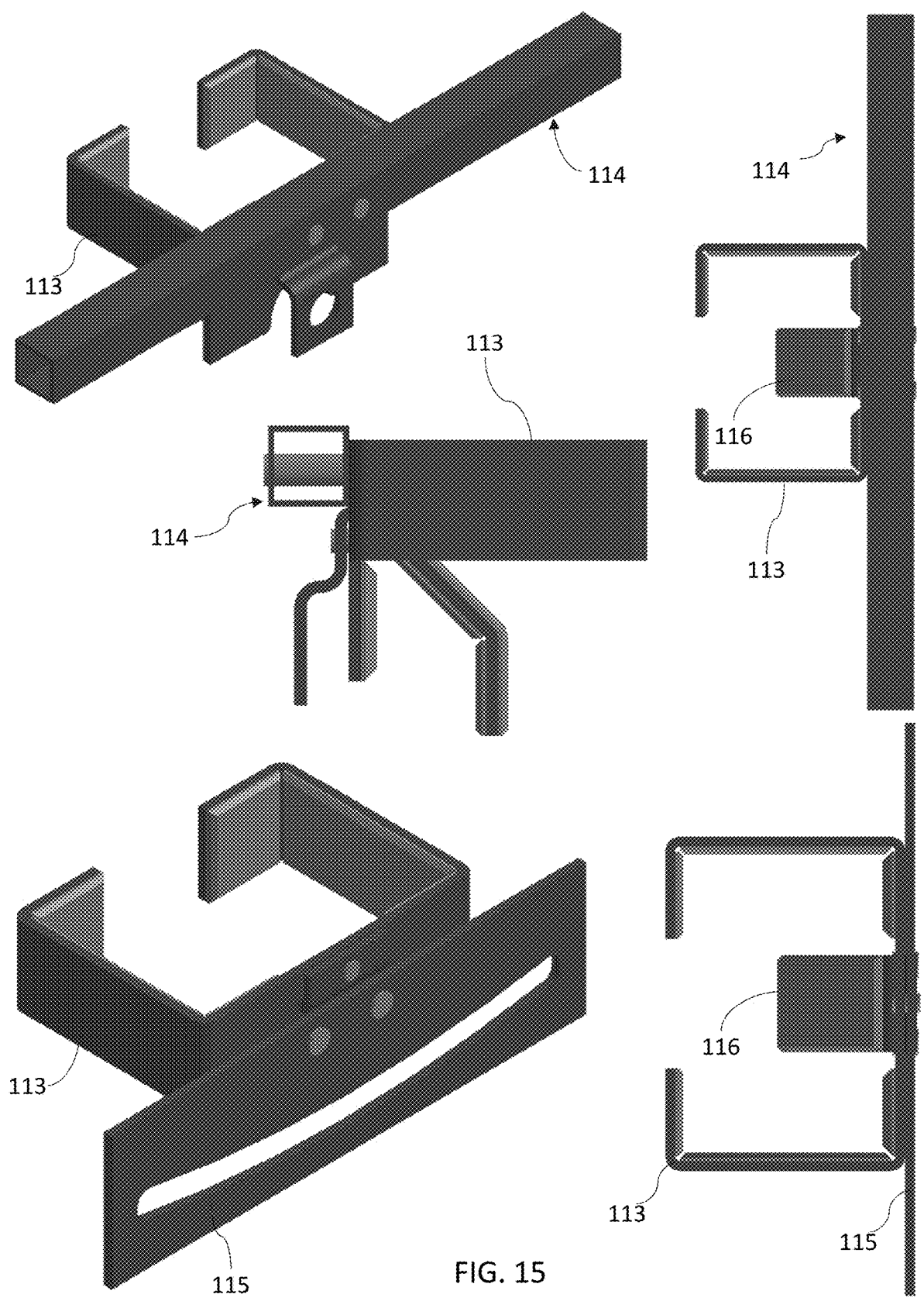
FIG. 15 illustrates an example ladder catch type trolley and handle configuration for use with the mast segment of FIG. 13.
Figure 16:
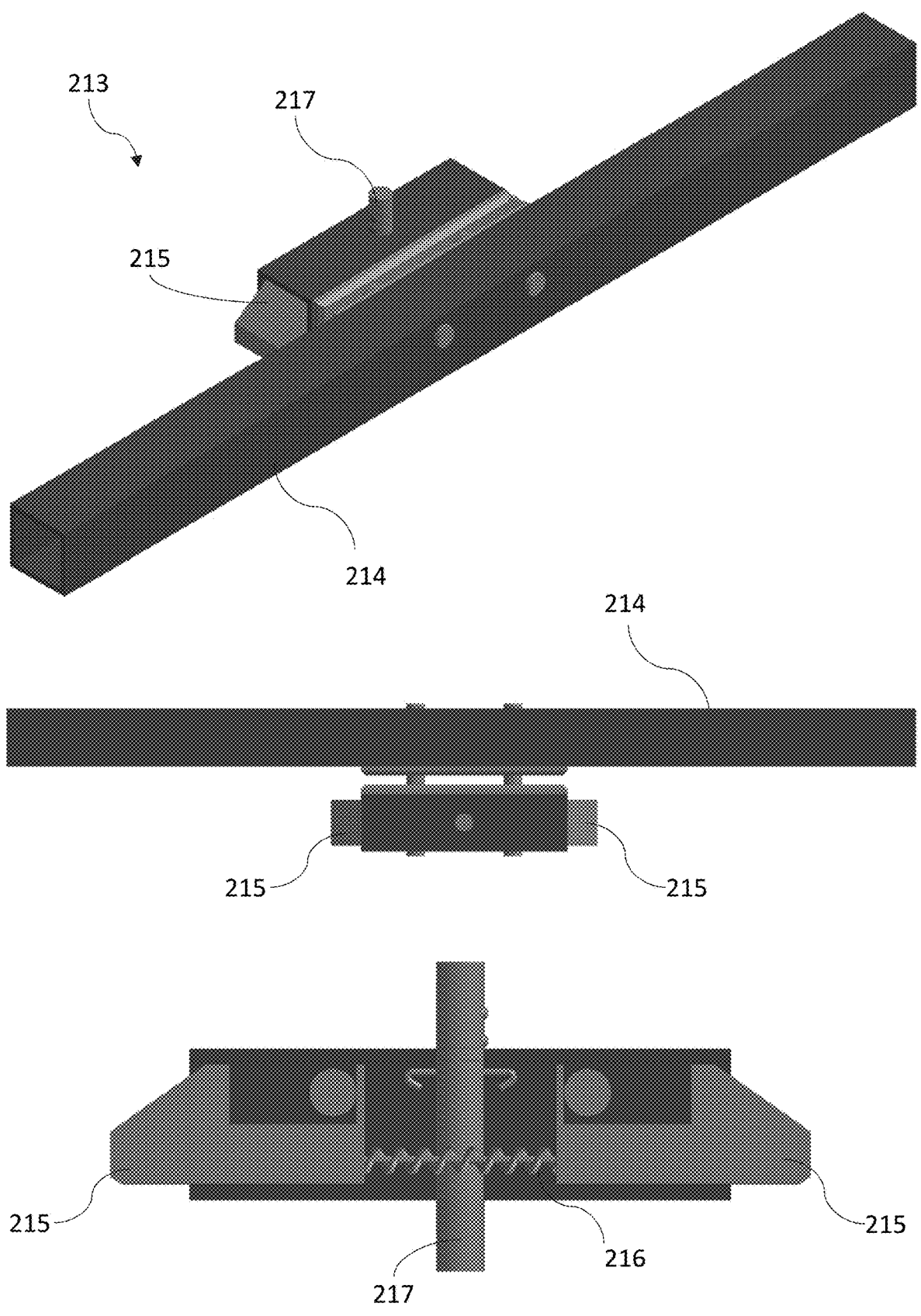
FIG. 16 illustrates an example latch type trolley and handle configuration for use with the mast segment of FIG. 14.
Figure 17:
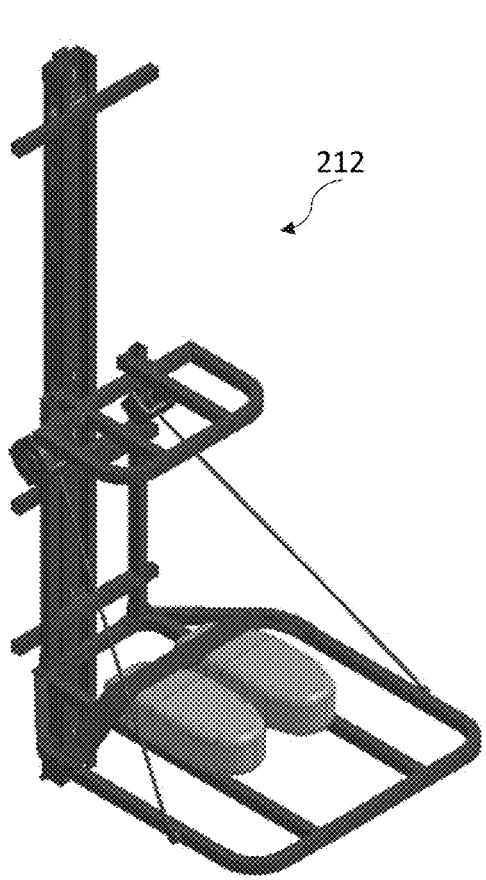
FIG. 17 illustrates the latch type trolley and mast segment examples of FIG. 14 and FIG. 16 connected to a platform assembly.
Figure 18:
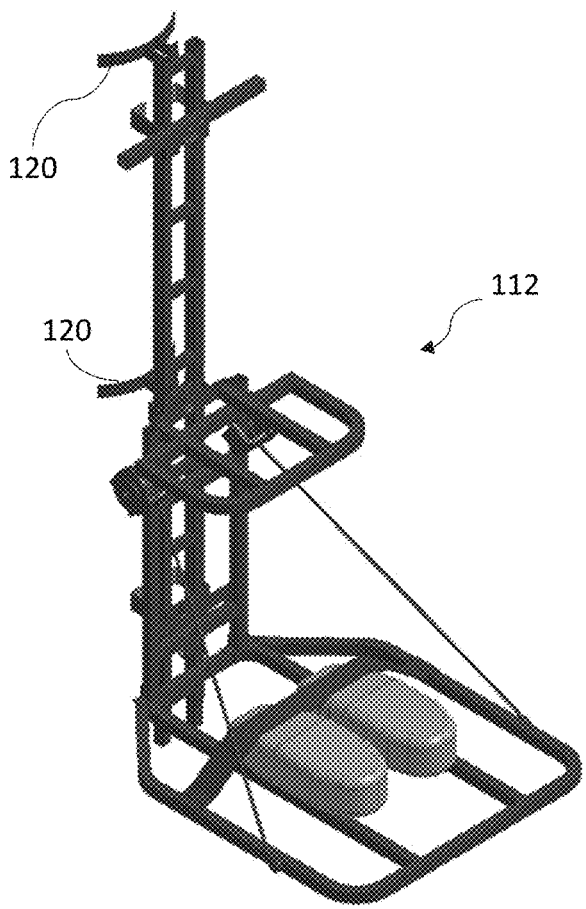
FIG. 18 illustrates the ladder catch type trolley and mast segment examples of FIG. 13 and FIG. 15 connected to a platform assembly.

FIGS. 12-19 illustrate a variety of possible mast configurations that are within the scope of the present disclosure. FIG. 12 illustrates an example cylindrical latch mast segment 12 which has been discussed with respect to the previous Figures. FIG. 13 illustrates a ladder mast segment 112 and FIG. 14 illustrates a rectangular latch mast segment 212. Other geometries and cross sections are contemplated and considered within the scope of the present disclosure. Mast segment 12 includes a trolley 13 that engages the travel holes 25 as it moves along mast 11. In this example, a plurality of travel holes 25 are formed vertically along mast segment 12.

Ladder mast segment 112 includes a pair of parallel and spaced apart squared rails 119 that extend upward and are connected by a plurality of horizontal bridge segments 121. The ladder trolley assembly 113 includes a ladder catch handle 114 and an optional tilt bracket 115. A catch 116 is provided to engage the bridge segment 121 as the trolley 113 moves upward along the mast segment 112. Ladder mast segment 112 further includes a spacer 120 for abutting against tree or another object. The ladder trolley assembly 113 defines a squared bracket portion that engages around the rails 119. A space is formed to allow for movement up and down over the spacer 120 when moving from one segment 112 to the next. Lower section 112A is reduced in size and/or tapered to mate with and securely next and engage with an opposite upper section of an adjacent mast segment 112 thus allowing for vertical stacking.

Rectangular latch segment 212 defines a rectangular cross section forming an opening for receiving a latch type trolley assembly 213 Latch trolley includes a squared handle 214 and a latch connector feature 215. The latch connector feature 215 is spring loaded by latch spring 216 that forces the latch connector features to extend outwardly and into the plurality of latch holes 225 positioned along the outer rails 219 of the latch segment 212. The latch features 215 include a ramped surface to recess inward against the spring when actuated by the handle so trolley 213 can move upward along mast segment 212. When the feature 215 is aligned with a hole 225, the force of the spring 216 causes the features to extend and protrude outwardly engaging and locking into the rails 219. A catch 217 allows for the features 215 to be retained to lower trolley 213 down the mast segment 212. Pulling up on the catch 217 releases the latch 215 to protrude outwardly engaging and locking into the rails 219. Mast segment 212 further includes a hinged connection 190 and 191 positioned at opposite ends that mate with an adjacent mast segment 212 to securely engage with an opposite hinged connection 190 and 191 of the adjacent mast segment 212 thus allowing for vertical stacking.

Figure 19:
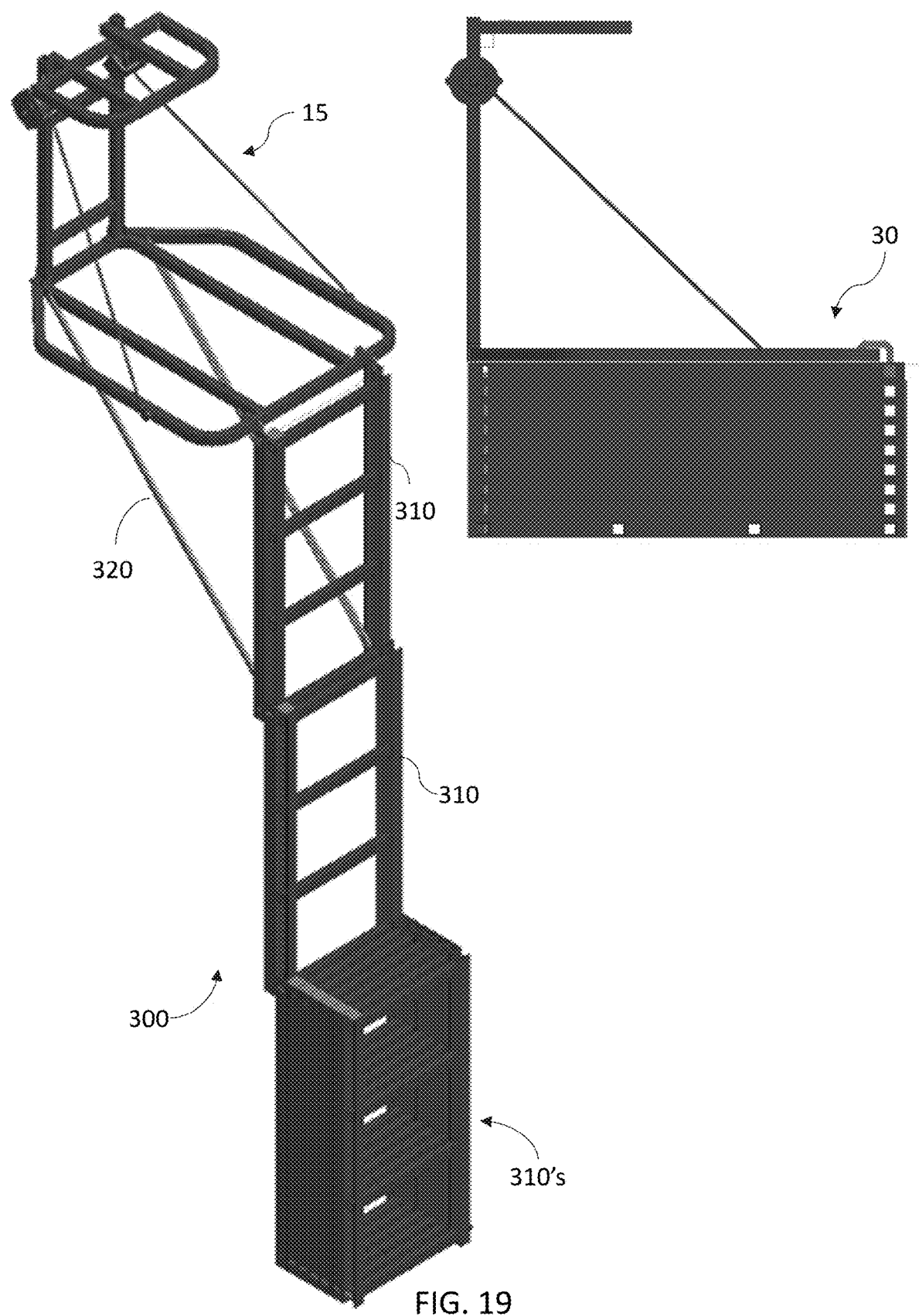
FIG. 19 illustrates an example climbing apparatus having a telescoping ladder attachment.

FIG. 19 illustrates a further exemplary embodiment of a telescoping ladder assembly 300 associated with the present disclosure. Assembly 300 provides for stackable ladder segments 310 are operable to stack upward and telescope down to a desired height. Platform assembly 15 extends from a top ladder segment 310 and then the continuous segments extend therefrom until a desired height is reached. The ladder assembly 300 can also be a rope ladder accessory. This allows for access to and from a higher vantage point when the platform assembly is intended to be fixed for a longer period. For example, so if a hunter chooses to leave the stand up in a tree for several weeks, the ladder accessory can be useful in allowing the user to come and go as they please.

Figure 20:
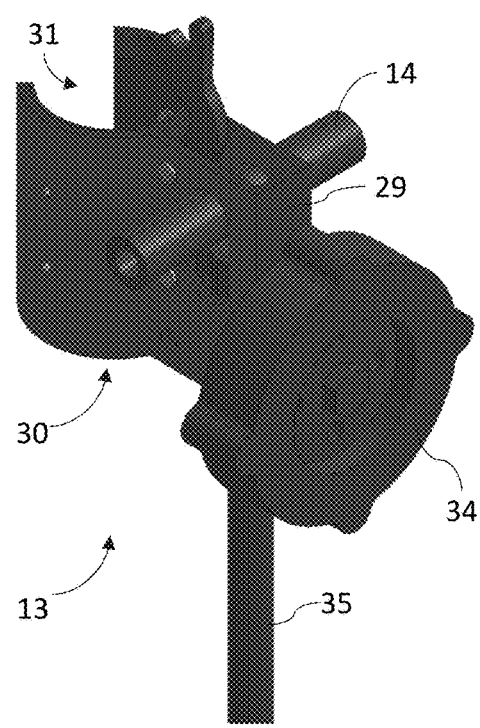
FIG. 20 illustrates an example trolley having a hydraulic brake mechanism.

FIGS. 20-24 illustrate a plurality of brake mechanisms associated with an example trolley of the present disclosure. An example trolley 13, as described with respect to FIG. 4, has similar components such as the brake body 30 formed of rounded sections 30A and 30B and an internal brake pad 31 operable to grip and engage a corresponding mast segment. FIG. 20 illustrates a hydraulic brake mechanism 28A which includes a hydraulic fluid to transfer force from handle 14 to engage the brake 30. A manual parking brake 34 also be provided as well as an emergency brake handle 35. The user controls handle 14 and thus can cause the brake to engage and disengage for desired movement of the trolley 13 up or down the mast 11. In addition, the brake body 30 can be fitted with wheels 32A to improve the movement of trolley 13 when assembled to the mast 11. This can function to replace slide 32.

Figure 21:
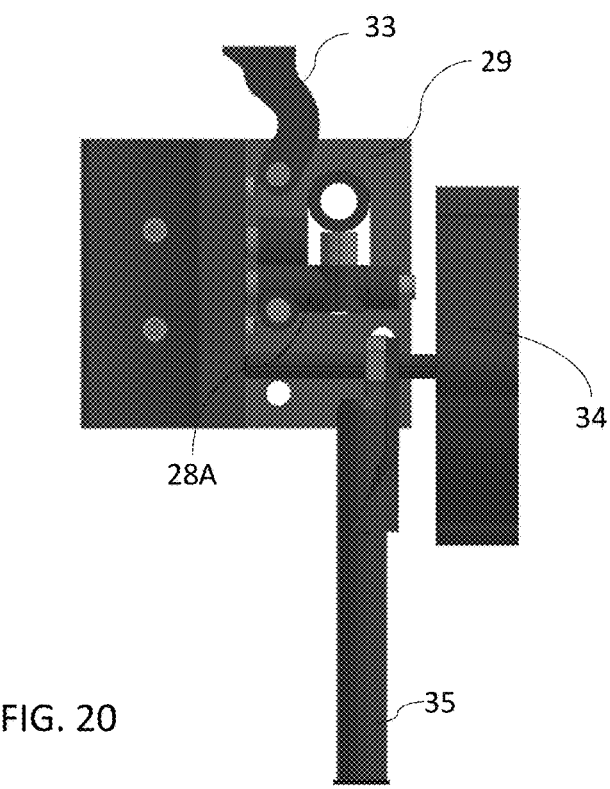
FIG. 21 illustrates an example trolley having a radial brake mechanism.

FIG. 21 illustrates a further embodiment of a radial brake mechanism 28B operable to achieve the result of actuating the brake when at rest through the handle 14 and disengaging the brake pads 31 when the handle is adjusted by the user.

Figure 22:
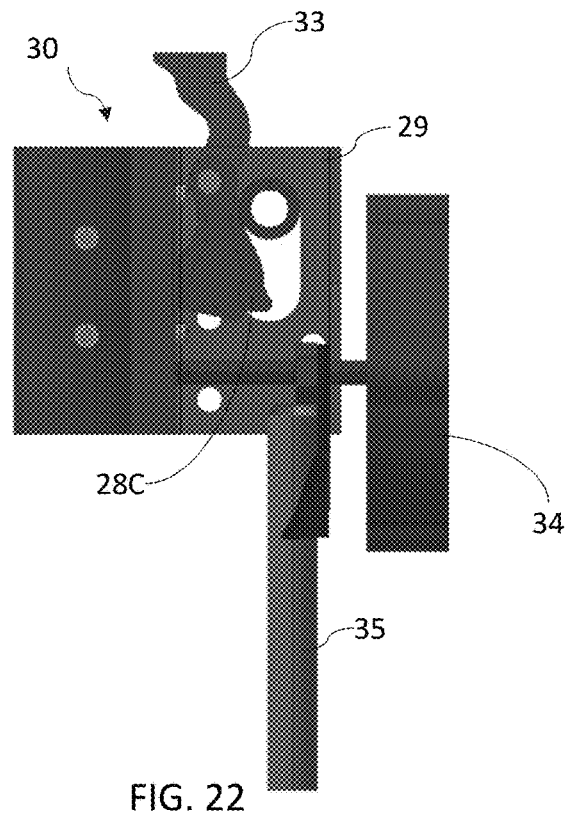
FIG. 22 illustrates an example trolley having a translation brake mechanism.
Figure 23A:
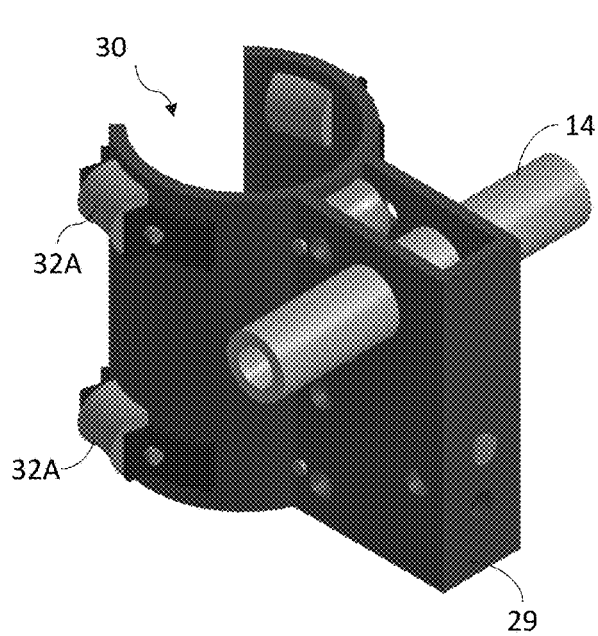
FIG. 23A-23B illustrates an example trolley having a latch-type brake mechanism.
Figure 23B:
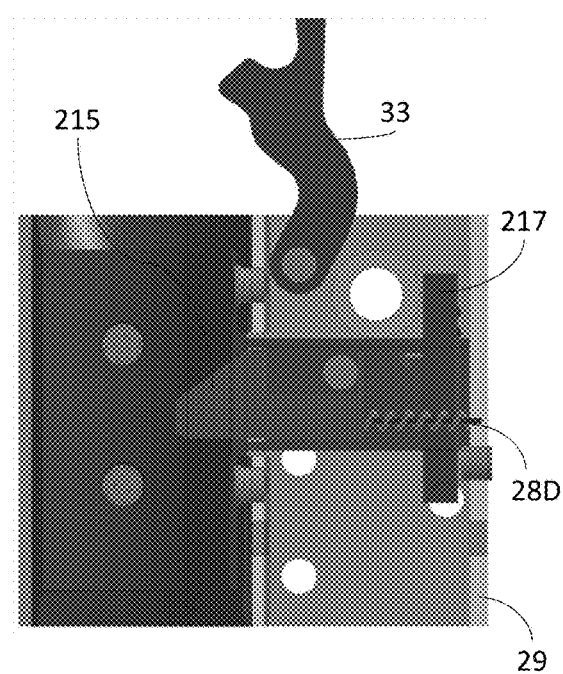

FIG. 22 illustrates still a further embodiment of a translation brake mechanism 28C. The handle 14 is still utilized to engage and disengage the brake pad 31 for desired movement up and down a mast 11. FIG. 23 illustrates a latch style brake mechanism 28D which includes a latch.

Figure 24A:
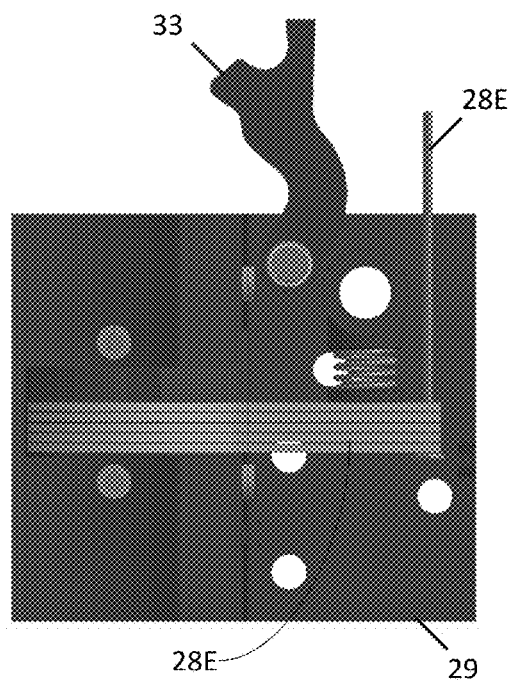
FIG. 24A-24B illustrates an example trolley having a leverage brake mechanism.
Figure 24B:
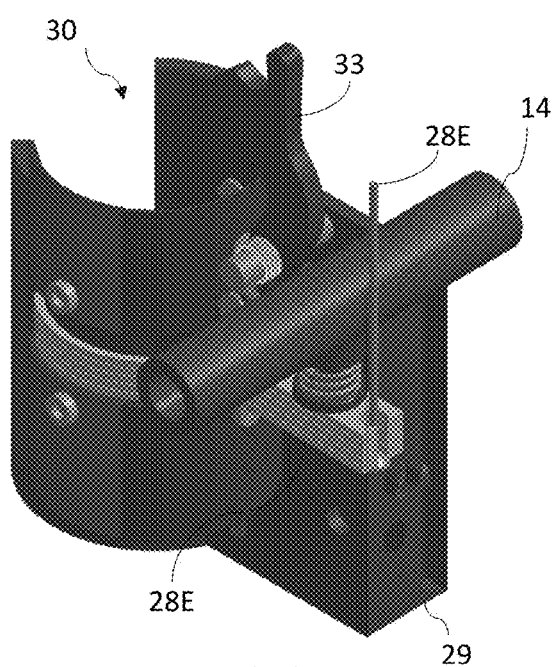

FIG. 24 illustrates an example leverage brake mechanism 28E which includes a compression spring to force leverage brake plates to bind the trolley to the mast upon actuation when at rest. The handle 14 is fixed and upon pushing the trolley 13 up the mast segment 12 via the fixed handle 14, the plates align through friction with the mast and compress spring. This action allows the trolley to move to the next desired vertical position. A release cable is provided and engages the binding plates which allows for pulling the plates into alignment for desired descending down the mast 11.

Figure 25:
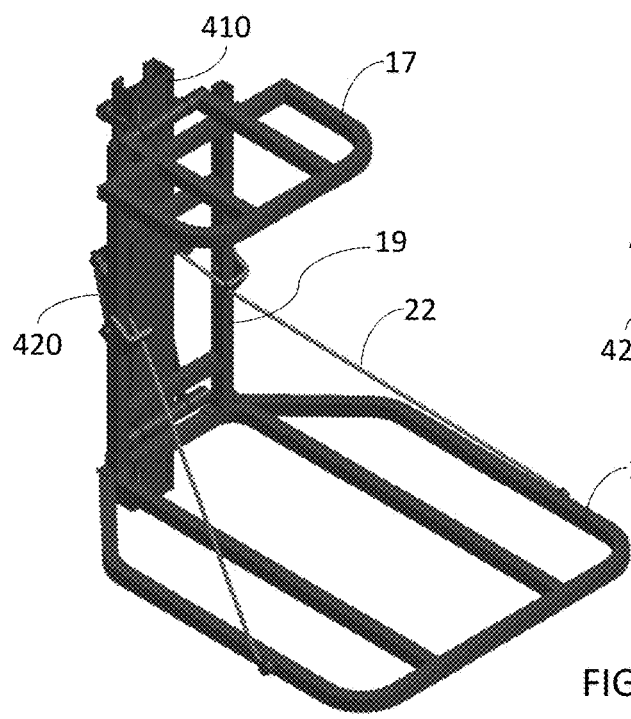
FIG. 25 illustrates an example of a leverage arm style climbing configuration.
Figure 25:
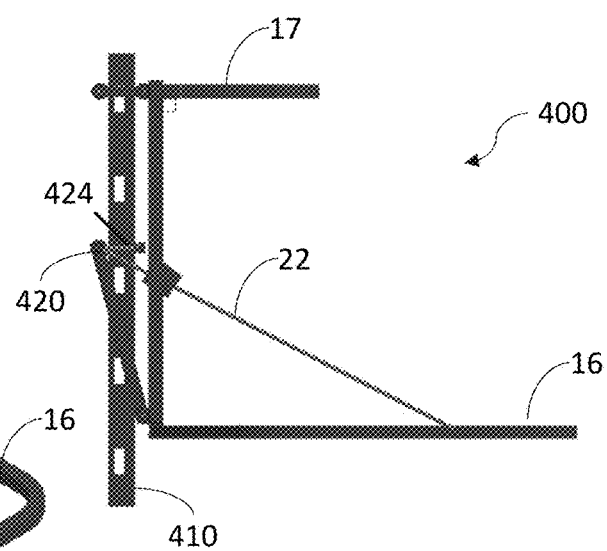

FIG. 25 illustrates a further example of a platform assembly 400 utilizing a leverage arm 420 as a trolley alternative. The leverage arm 420 is connected to an H-frame of the platform assembly 400 and extends around and behind a leverage style rectangular mast 410. At a distal end 422 of arm 420, a protruding safety catch 424 extends passed the mast 420 to keep the binding action engaged (manually set by user as needed). By pulling up on the platform 16, the leverage arm 420 unbinds with mast 410 and allows for mobility up the mast 410.

Figure 26:
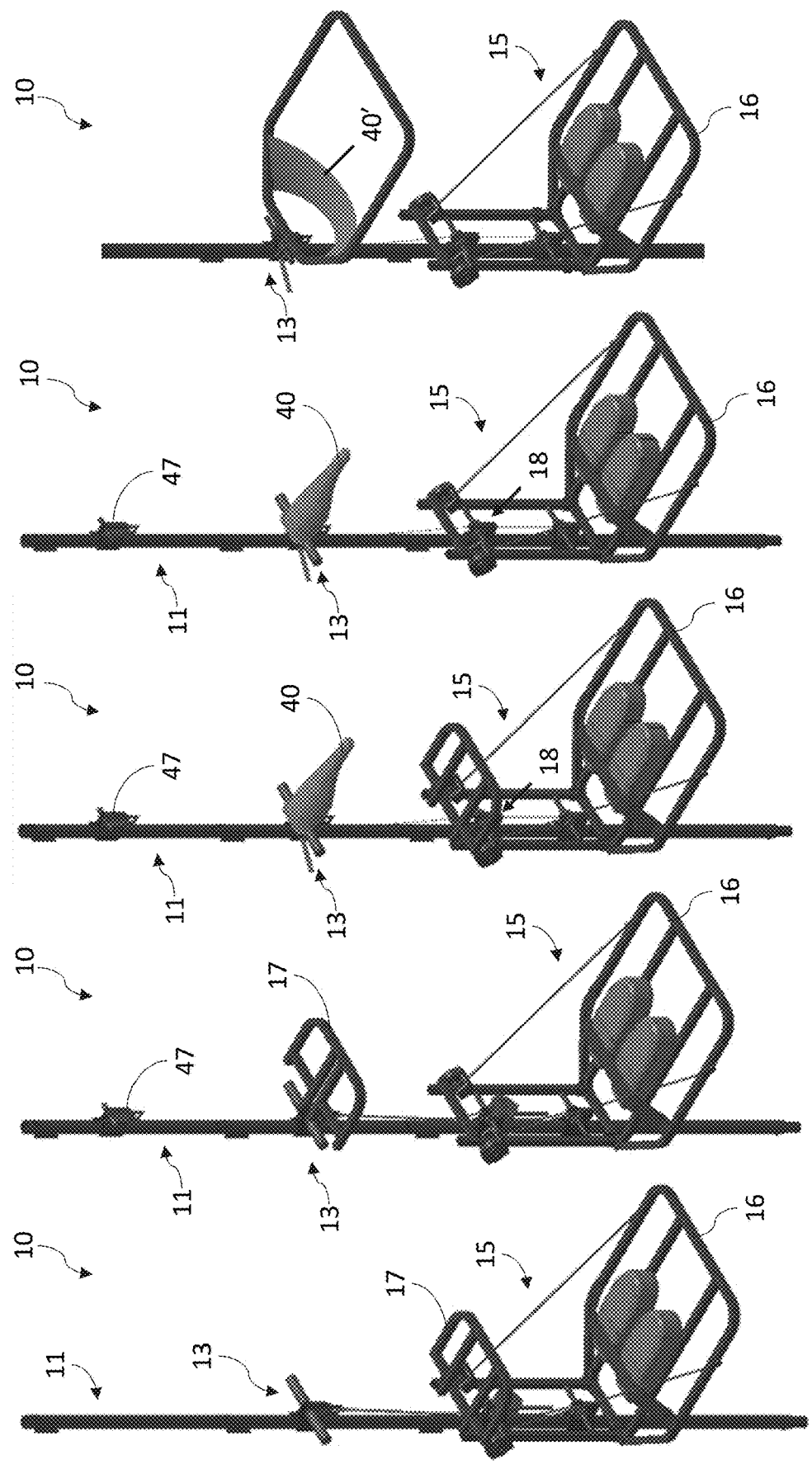
FIG. 26 illustrates various configurations having a plurality of trolleys and seating components.
Figure 27:
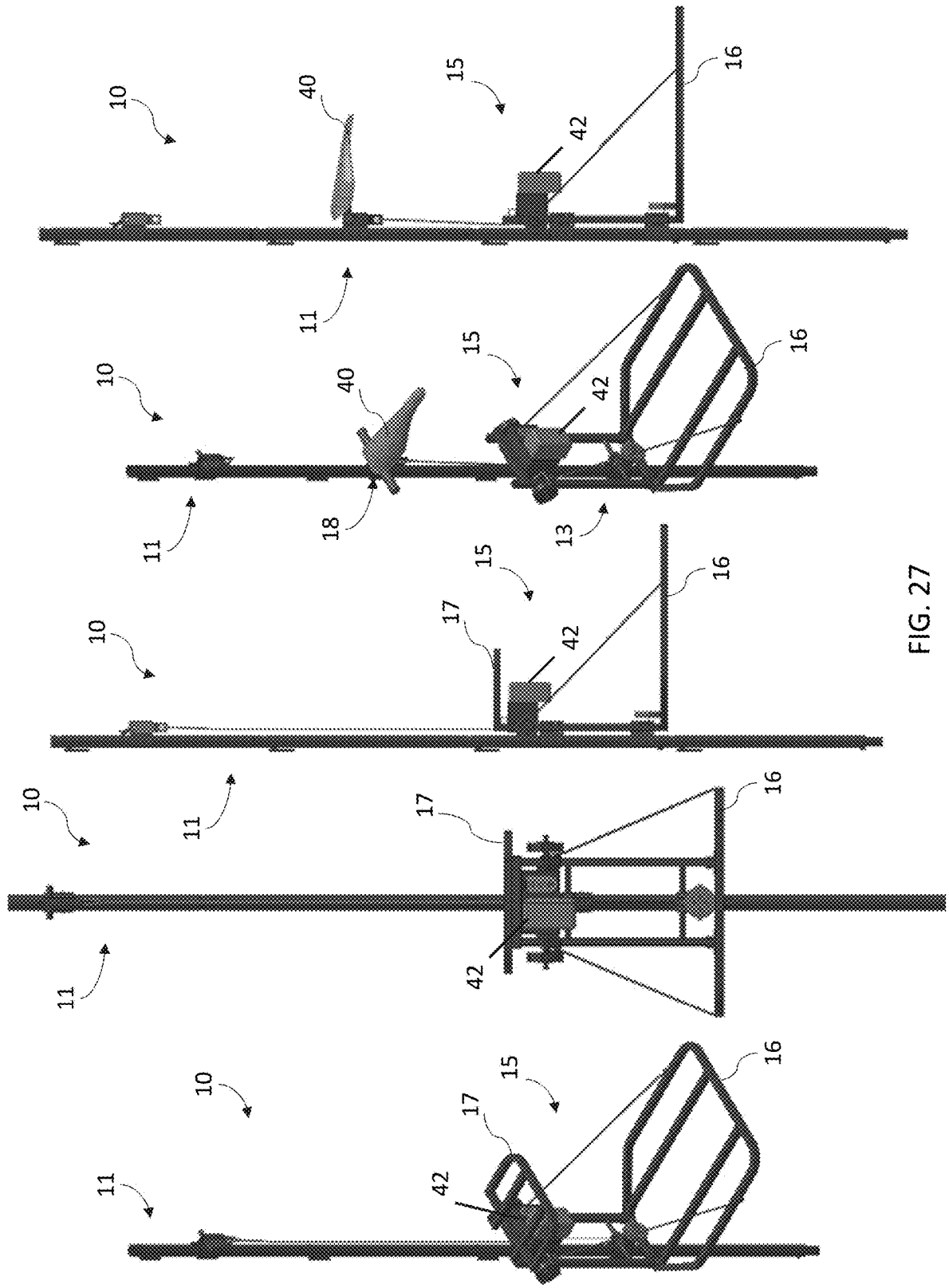
FIG. 27 illustrates various configurations having a plurality of trolleys and seating components with an electric powered motor.

FIGS. 26-27 illustrate a variety of embodiments of an exemplary climbing apparatus 10. The present disclosure provides for an apparatus 10 having the option to utilize a plurality of trolley features including manual (FIG. 26) or motorized (FIG. 27). The apparatus 10 can include an upper trolley 13 connected to a handle 14 and further include a lower trolley 18 connected to a platform assembly 15. The platform assembly can include a seat 17 rotatable with respect to an H-frame 19 or in combination with a saddle 40. The seat 17 can further connected to mast 11 independent from the H-frame 19 allowing for further freedom of movement and customization. Saddle 40 can be connected to a separate and independent trolley 13 with respect to the lower trolley 18. The seat 17 can also be removed leaving a trolley on saddle 40 and a trolley on platform assembly 15. In yet a further example, a strap saddle 40' can be provided to as an alternative to the bicycle-style saddle 40. Seats 40 and 40' offer the user an opportunity to stand on platform 16 while maintaining a degree of support and stability. This is particularly beneficial for bow hunting. The apparatus 10 can further include a harness attachment point 47.

FIG. 28 illustrates a schematic of an example apparatus 10 positioned against an example climbing object T which can be a tree, pole, or the like. In this example, the apparatus 10 includes a motorized unit 42 operable for raising and lowering the platform assembly 15.

Figure 29:
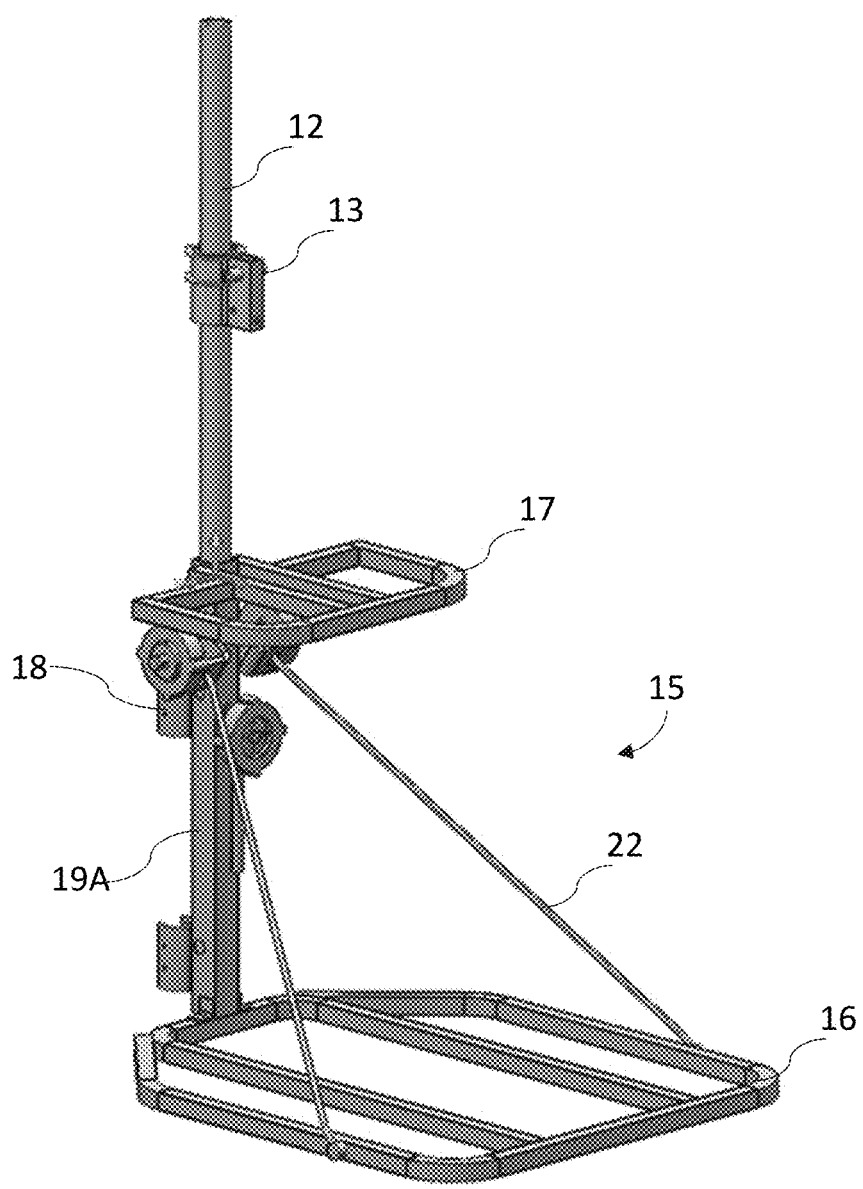
FIG. 29 illustrates a further example having a tube nested within the stand to support the adjustable seat.

FIG. 29 illustrate a further embodiment of the present disclosure. In this example, a mast segment 12 is operable to be nested within post 19A. This can provide additional support for the adjustable seat 17 and work with one or more corresponding trolleys 18. It also can be connected to other mast segments 12 that form a mast 11 when connected together.

Figure 30A:
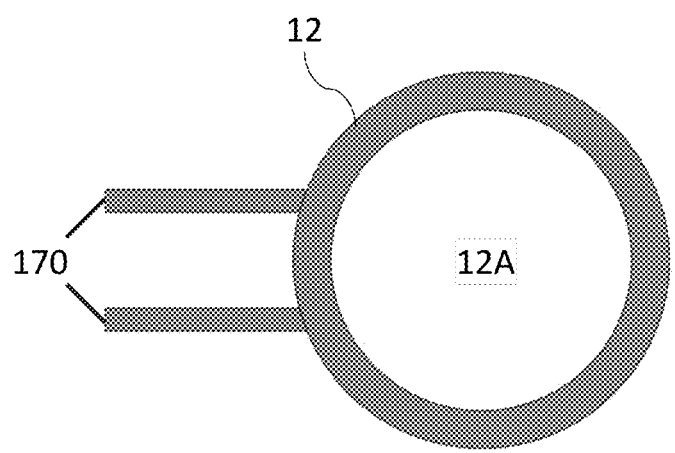
FIG. 30A-30B illustrate a top view and a side view of an example mast segment having ribs to control stand rotation.
Figure 30B:
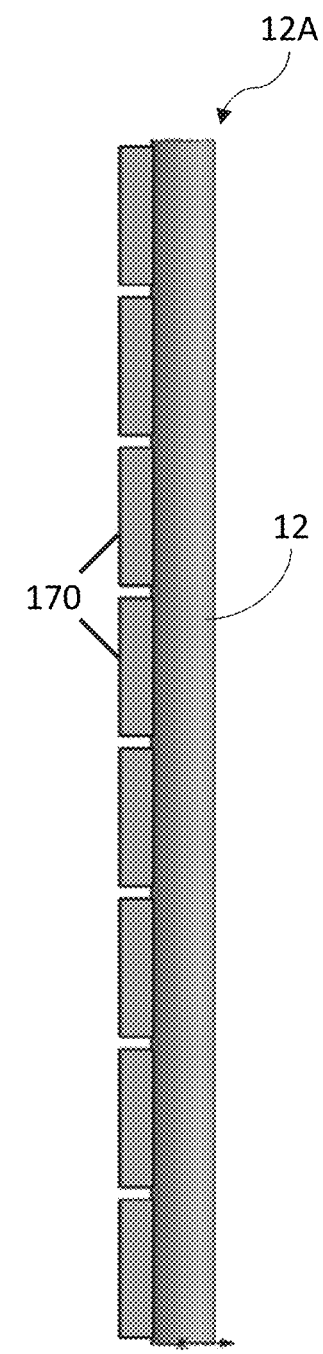

FIG. 30 provide for an additional example where the mast segment 12 further includes ribs 170 that extend out from the tube 12. These optional ribs 170 further include slots defined there between to add flexibility in the tube 12 as it is raised against a climbing object like a tree of non-uniform thickness and size. The ribs 170 operate to control stand rotation and the slots reduce rigidity. This is especially useful when the tree or climbing object is not entirely straight.

Figure 31:
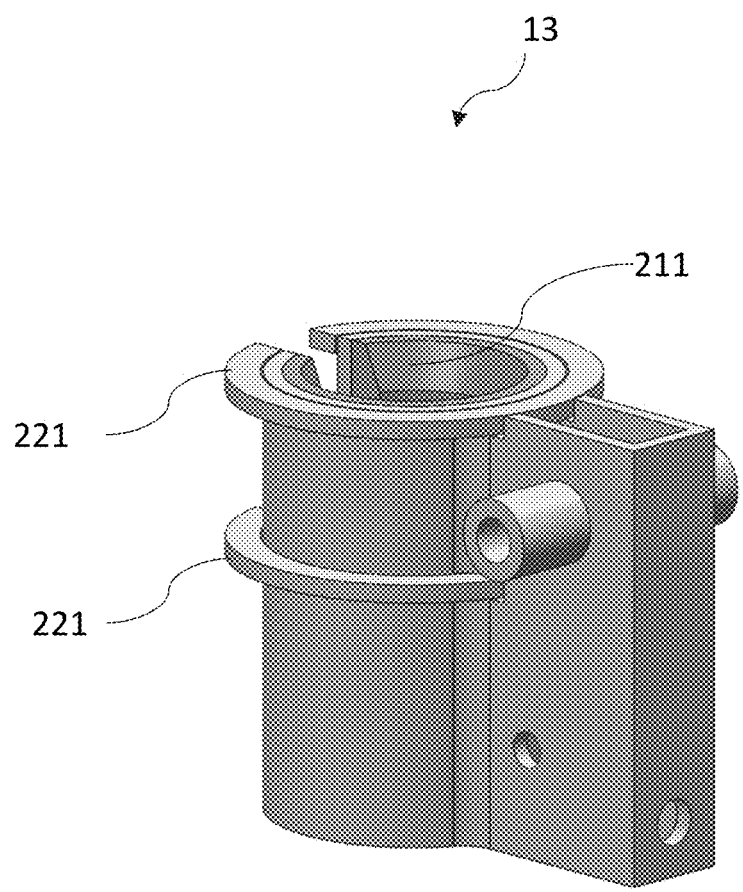
FIG. 31 is a perspective view of an example trolley body having a reinforced support ring and a spacer.

FIG. 31 provides for a further example of a trolley 13 having at least one reinforcement ring 221 to increase strength and prevent undesired bending or breaking. The trolley can further include an additional spacer 211. In this example, the spacer 211 is a nylon spacer and is positioned within the main body 13. A slight opening is formed to allow for accommodating ribs 170 when engaged with a mast segment 12 as shown in FIG. 30. In this example, two reinforcement rings 221 are provided and spaced apart to provide added support.

The various examples of a climbing apparatus, system, and method of the present disclosure provides for several advantages over existing products including but not limited to:

interchangeable independent or integrated trolley platform structure;

a mast structure with low profile or collapsible vertical members and stand offs;

a hand and/or support rail trolley(s) to aid ascent & descent, also supports safety harness and/or repelling gear;

an optional saddle trolley, alone or in addition to other trolley(s), for infinitely variable seating heights;

trolley can include a brake mechanism having any of a friction brake, latching style brake, binding brake, ladder rung catch (with under rung latching bar), or the like, including an optional emergency brake;

electro-mechanical lift device (i.e., a winch with cable connected from platform to hand trolley);

a tripod base accessory and support top with cable guide wires to mechanically constrain a free-standing mast and trolley construction;

a stand leveling features such as adjustable cable length (X axis), tilt bracket (Y axis), and saddle trolley (Z axis);

a rope ladder, telescoping ladder, and/or folding ladder to access platform when left raised for extra stealth and security;

a structure to support gear during ascent/descent;

a structure to support organized packing of components for portability;

a combination ratchet/cam strap with quick attach hook for speedy and tight tree attachment (optional locking mechanism) (not shown);

mounts to external tree harness as integral unit for packing into the hiking area;

Improved safety including:
  stand is secured at ground level;
  climbing is performed with stand & equipment secured;
  climber is always safely harnessed even during set up;
Improved portability including:
  shorter sticks (i.e., mast segments) for better packing;
  shorter sticks limit snagging potential;
  light-weight solution;
Faster setup including:
  fasten sticks and climb with stand secured at same time;
  reduced noise to allow faster climb speed;
  tree can be imperfect aiding in quicker selection of tree;
  an imperfect tree often provides more concealment to the climber;
Easier setup including:
  modular design allows any height;
  integrated gear supports;
  trolley has feature to ensure platform is level;
  the mast sets a limit to how high you can climb based on climber preference;
Improved security including:
  stand can be left elevated when unattended; and
  stand can be locked in position.

It is important to note that various combinations of the disclosed features and components are contemplated and within the scope of the present disclosure. For example, a plurality of trolleys can be included in an example climbing apparatus 10 for the climbing of a plurality of components including a harness attachment point, a seat or saddle, a platform or other components. Each trolley can be independent from any other trolley or ganged together or any combination thereof and can be powered by a motor or manually. Moreover, each trolley can include a different brake mechanism from any other trolley.

It should be noted that the steps described in the method of use can be carried out in many different orders according to user preference. The use of "step of" should not be interpreted as "step for", in the claims herein and is not intended to invoke the provisions of 35 U.S.C. § 112(f). Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the disclosure described herein are exemplary and numerous modifications, variations and rearrangements can be readily envisioned to achieve substantially equivalent results, all of which are intended to be embraced within the spirit and scope of the disclosure. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A climbing apparatus comprising:
   (a) a mast comprising a plurality of detachable elongated cylindrical mast segments configured to vertically stack one after another, wherein each mast segment includes a stand-off to abut against a climbing object and form a space for receiving a strap to secure the mast to the climbing object;
   (b) a platform assembly comprising (i) a platform operable for standing, (ii) a seat spaced apart from the platform, and (iii) a frame connecting the seat to the platform;
   (c) an upper trolley configured for independent mobility up and down along the mast, the upper trolley having a first leverage brake mechanism that binds the upper trolley to the mast and connected to a handle configured to actuate movement of the trolley; and
   (d) a lower trolley configured for independent mobility up and down along the mast relative to the upper trolley, the lower trolley having a second leverage brake mechanism that binds the lower trolley to the mast and connected to the frame of the platform assembly, the lower trolley configured for independent mobility up and down along the mast.

2. The climbing apparatus of claim 1, wherein the upper trolley includes a harness connection point configured to secure a harness of a user for safety.

3. The climbing apparatus of claim 1, wherein each of the first leverage brake mechanism and second leverage brake mechanism further include a release mechanism for release of the binding.

4. The climbing apparatus of claim 3, wherein the release mechanism is configured to be activated at the upper trolley by a member selected from the group consisting of a lever, a cable, an electromechanical mechanism, and combinations thereof.

5. The climbing apparatus of claim 1, wherein the seat of the platform assembly is removable and rotatable relative to the mast.

6. The climbing apparatus of claim 1, further comprising support cables extending from the frame to the platform and wherein the support cables are connected to a platform level handle configured to be gathered up by the platform level handle and control a level of the platform.

7. The climbing apparatus of claim 1, wherein the platform assembly is foldable and configured to allow the platform, the frame and the seat to fold together for stowing and carrying, and wherein the mast segments are detachable into a stackable and storable arrangement with the foldable platform assembly.

8. The climbing apparatus of claim 1, wherein each mast segment includes a lower end and an opposite top end and wherein each lower end is tapered for nesting the lower end into the top end of an adjacent mast segment.

9. The climbing apparatus of claim 1, further comprising a detachable seat that connects to the mast through an additional third trolley having a third brake mechanism and movable up and down the mast independent from either the upper or lower trolley.

10. The climbing apparatus of claim 1, further comprising a universal mounting bracket and adjustable tilt plate, wherein a mounting bracket trolley is configured to connect the universal mounting bracket to the mast and allows for retrofitting a platform assembly to the mast.

11. The climbing apparatus of claim 1, further comprising a tripod accessory having a mast cap connected to tripod extension cables that extend to tripod base members and configured for securing the mast in an upright freestanding configuration for climbing in the absence of a climbing object.

12. The climbing apparatus of claim 1, wherein the upper and lower trolley are ganged together by a cable of sufficient strength to support a user and accessories and wherein at least one of the upper or lower trolley is motorized, wherein the cable is then gathered up or released by the motorized trolley.

13. The climbing apparatus of claim 12, further comprising a control panel for the motorized unit, wherein the control panel is configured for actuation of up, down, unlatch and wireless communication to a remote controlling device; and wherein, the control panel can accommodate a power outlet for powering or charging an external device.

14. The climbing apparatus of claim 1, further comprising a plurality of additional trolleys configured for customization and use of additional components, wherein the plurality of additional trolleys are configured to fit on the mast and wherein the plurality of additional trolleys can operate independently, connected to work together with respect to the other trolleys, or a combination thereof.

15. The climbing apparatus of claim 3, wherein the first and second leverage brake mechanism includes a compression spring configured to force a plurality of leverage brake plates to bind the respective upper and lower trolley to the mast upon actuation when at rest.

16. The climbing apparatus of claim 15, wherein the handle of each of the upper and lower trolley is fixed and configured to allow upward movement each of the upper and lower trolley when pushed up the mast segment causing the compression spring to compress and the leverage brake plates to align with the mast, and wherein each of the upper and lower trolley can be moved to an upward vertical position along the mast.

17. The climbing apparatus of claim 16, wherein the release mechanism includes a release cable engaging the plurality of binding plates configured for pulling the plates into alignment for descending down the mast.

18. A climbing apparatus comprising:
   (a) a mast comprising a plurality of detachable elongated cylindrical mast segments configured to vertically stack one after another, wherein each mast segment includes a stand-off to abut against a climbing object and form a space for receiving a strap to secure the mast to the climbing object;

(b) a platform assembly comprising (i) a platform operable for standing, (ii) a seat spaced apart from the platform, and (iii) a frame connecting the seat to the platform;

(c) an upper trolley configured for independent mobility up and down along the mast, the upper trolley having a first brake mechanism connected to a handle configured to actuate movement of the trolley; and (d) a lower trolley configured for independent mobility up and down along the mast relative to the upper trolley, the lower trolley having a second brake mechanism and connected to the frame of the platform assembly, the lower trolley configured for independent mobility up and down along the mast, wherein each of the first and second brake mechanisms engage the mast through a brake pad actuated by the handle and wherein the handle includes a brake actuating handle.

19. The climbing apparatus of claim 18, wherein each of the first and second brake mechanism is selected from the group consisting of hydraulic brake, radial brake, translation brake, and combinations thereof.

\* \* \* \* \*